(12) United States Patent
Perez-Ramirez et al.

(10) Patent No.: US 11,570,638 B2
(45) Date of Patent: Jan. 31, 2023

(54) AUTOMATED NETWORK CONTROL SYSTEMS THAT ADAPT NETWORK CONFIGURATIONS BASED ON THE LOCAL NETWORK ENVIRONMENT

(71) Applicant: Intel Corporation, Santa Clara, CA (US)

(72) Inventors: Javier Perez-Ramirez, North Plains, OR (US); Javier Turek, Beaverton, OR (US); David Gonzalez Aguirre, Hillsboro, OR (US); Javier Felip Leon, Hillsboro, OR (US); Ignacio Alvarez, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 285 days.

(21) Appl. No.: 16/913,541

(22) Filed: Jun. 26, 2020

(65) Prior Publication Data
US 2020/0329386 A1      Oct. 15, 2020

(51) Int. Cl.
*H04W 24/06*       (2009.01)
*H04W 28/02*       (2009.01)
(Continued)

(52) U.S. Cl.
CPC ............ *H04W 24/06* (2013.01); *H04L 45/08* (2013.01); *H04W 28/0236* (2013.01); *H04W 28/0278* (2013.01); *H04W 36/30* (2013.01)

(58) Field of Classification Search
CPC ............ H04W 24/06; H04W 28/0236; H04W 28/0278; H04W 36/30; H04W 40/02;
(Continued)

(56) References Cited

U.S. PATENT DOCUMENTS

2018/0234901 A1*   8/2018   Suh .................. H04W 36/32
2018/0283882 A1*   10/2018  He ..................... G01C 21/3407
(Continued)

OTHER PUBLICATIONS

Moysen et al, "Big Data-driven Automated Anomaly Detection and Performance Forecasting in Mobile Networks", ELISA, 2020 (Year: 2020).*

(Continued)

*Primary Examiner* — Omer S Mian
(74) *Attorney, Agent, or Firm* — Jordan IP Law, LLC

(57) ABSTRACT

Systems, apparatuses and methods may provide for technology that adjusts, via a short-term subsystem, a communications parameter for one or more of wireless communication devices based on data from one or more of a plurality of sensors. The technology may also determine, via a neural network, a prediction of future performance of the wireless network based on a state of the network environment, wherein the state of the network environment includes information from the short-term subsystem and location information about the wireless communication devices and other objects in the environment, and determine a change in network configuration to improve a quality of communications in the wireless network based on the prediction of future performance of the wireless network. The technology may further generate generic path loss models based on time-stamped RSSI maps and record a sequence of events that cause a significant drop in RSSI to determine a change in network configuration.

25 Claims, 11 Drawing Sheets

(51) Int. Cl.
*H04W 36/30* (2009.01)
*H04L 45/02* (2022.01)

(58) Field of Classification Search
CPC .. H04W 24/04; H04W 24/02; H04L 41/0823; H04L 41/145; H04L 41/12; H04L 41/0886; H04L 41/0816; H04L 41/0681; H04L 41/0645; H04L 41/065; H04L 45/08; G06N 3/049; G06N 3/08; Y02D 30/70

See application file for complete search history.

(56) References Cited

U.S. PATENT DOCUMENTS

| | | | |
|---|---|---|---|
| 2022/0021469 A1* | 1/2022 | Veijalainen | H04B 17/15 |
| 2022/0028001 A1* | 1/2022 | Wachell | G06Q 40/025 |
| 2022/0075739 A1* | 3/2022 | Yaacov | G06N 20/00 |
| 2022/0113790 A1* | 4/2022 | Doshi | H04L 41/5009 |

OTHER PUBLICATIONS

Nguyen et al, "Enabling AI in Future Wireless Networks: A Data Life Cycle Perspective", IEEE, 2021 (Year: 2021).*

T. Adame et al., "The TMB path loss model for 5 GHz indoor WiFi scenarios: On the empirical relationship between RSSI, MCS, and spatial streams," Dec. 8, 2018, 8 pages, <arxiv.org/pdf/1812.00667.pdf>.

G. Brown, "Ultra-Reliable Low-Latency 5G for Industrial Automation," Heavy Reading Reports, 11 pages, <qualcomm.com/media/documents/files/read-the-white-paper-by-heavy-reading.pdf>, retrieved Jun. 24, 2020, Qualcomm, Inc.

cisco.com, "5 Things to Know About Wi-Fi 6 and 5G," 11 pages, <cisco.com/c/m/en_us/solutions/enterprise-networks/802-11ax-solution/nb-06-5-things-WiFi6-5G-infograph-cte-en.html>, retrieved Jun. 24, 2020.

F. Grijpink et al., "The road to 5G: The inevitable growth of infrastructure cost." Article, 9 pages, <mckinsey.com/industries/technology-media-and-telecommunications/our-insights/the-road-to-5g-the-inevitable-growth-of-infrastructure-cost#>, Feb. 23, 2018.

S. Sadowski et al., "RSSI-Based Indoor Localization With the Internet of Things," IEEE Access, Jun. 4, 2018, 14 pages, <C:/Users/JIP-W10/Downloads/rssi-compressed.pdf>, retrieved Jun. 24, 2020.

C. Studer et al., "Channel Charting: Locating Users within the Radio Environment using Channel State Information," Aug. 21, 2018, 15 pages, <arxiv.org/pdf/1807.05247.pdf>.

X. Wang et al., "DeepFi: Deep Learning for Indoor Fingerprinting Using Channel State Information," 2015 IEEE Wireless Communications and Networking Conference (WCNC), pp. 1666-1671, <eng.auburn.edu/~szm0001/papers/WangWCNC2015b.pdf>, 2015.

J. Yin et al., "Learning Adaptive Temporal Radio Maps for Signal-Strength-Based Location Estimation," IEEE Transactions on Mobile Computing, vol. 7, Issue 7, Jul. 2008, 14 pages, <cs.ust.hk/~qyang/Docs/2007/TemporalMap_M1.pdf>.

* cited by examiner

AUTOMATED NETWORK CONTROL SYSTEMS THAT ADAPT NETWORK CONFIGURATIONS BASED ON THE LOCAL NETWORK ENVIRONMENT

TECHNICAL FIELD

Embodiments generally relate to automated control systems. More particularly, embodiments relate to technology for automated network control systems that adapt a network configuration based on the local network environment.

BACKGROUND

Automated control systems may be used in a variety of environments such as, for example, industrial environments. In industrial environments, communications between devices are often required to be highly reliable. Increasing the reliability of communications has typically been associated with wired interfaces, where the capacity of the communication channel is fixed and specific to the physical properties of the wired propagation medium. Wired communications networks present disadvantages, however, such as cost of deployment and lack of deployment flexibility. While highly reliable wireless communications in these kinds of environments may be desirable, the stochastic nature of the wireless propagation medium makes extensive monitoring of the network necessary to guarantee packet delivery rates (PDR) compliant with network requirements. Industrial environments, where a wireless channel typically exhibits long delay spread, provide unique challenges to achieving highly reliable wireless communications. Furthermore, changes in the environment can cause sudden degradation of the wireless channel, thus impacting reliability. Reliability can be also affected by the presence of interfering sources, such as moving objects. Although frequency and spatial redundancy techniques can be used to address these issues, these techniques have disadvantages, such as the cost of duplicating information sent.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

In general, embodiments provide an automated network control system that adapts a network configuration based on the local network environment, such as, for example, an industrial setting. Embodiments also provide for collecting sensory information and learning wireless propagation parameters of moving objects in the environment. Additionally, embodiments include technology that predicts the effects that environmental changes have on wireless signal quality and adjusts transmission modes accordingly. Embodiments also provide for using a learned channel model to predict the effect of different configurations in the network traffic quality and jointly optimize configuration for all network devices.

More particularly, embodiments of the wireless network control system use a multi-unit structure including a short-term store subsystem that implements time-critical responses, and a long-term store subsystem that coordinates non-time critical responses for maintaining overall network reliability. Embodiments, thus, provide technology enabling the network control system to make immediate changes in communication (e.g. to avoid interference) and also learn coordinated decisions that improve the quality of communications in the future. The network control system may collect information about the local environment in which the system operates using a myriad of sensory registers such as, e.g., cameras, radar, and RF sniffer nodes. Information collected by these sensor nodes may be processed and stored in short-term and long-term memory modules.

Figure 1A:
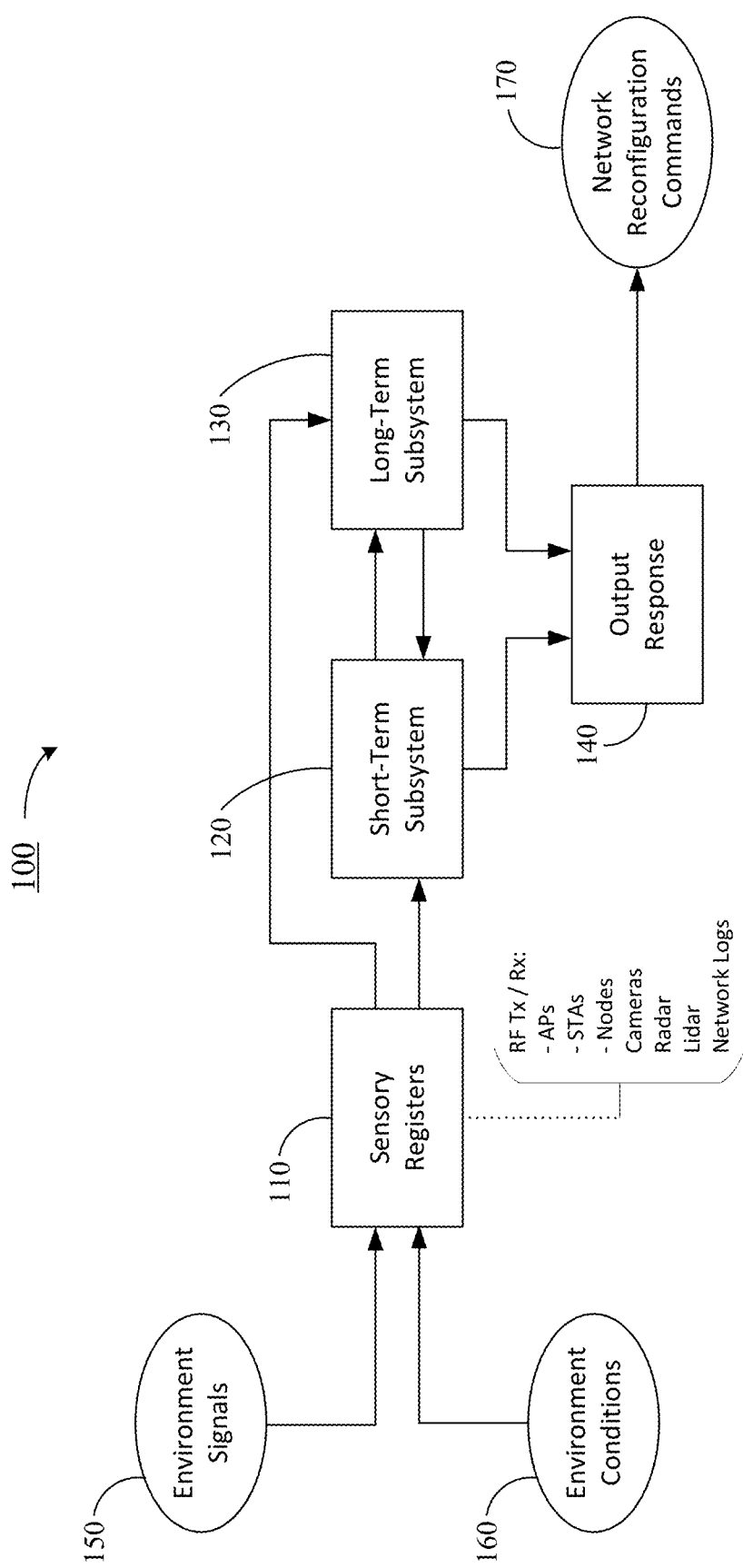
FIGS. 1A-1B provide block diagrams illustrating examples of a wireless network control system according to one or more embodiments.

FIG. 1A is a block diagram illustrating an overview of an example wireless network control system 100 according to one or more embodiments, with reference to components and features described herein including but not limited to the figures and associated description. The wireless network control system 100 may include a set of sensory registers (i.e., sensor nodes) 110, short-term subsystem 120, long-term subsystem 130, and output response module 140. The wireless network control system 100 may receive as input environmental signals 150, which may include signals such as, e.g., RF signals from one or more access points (APs), one or more stations (STAs) and/or from other nodes, and imagery or video from one or more cameras, signals from radar or lidar, etc. The wireless network control system 100 may also receive as input environmental conditions 160, which may include identification and location information for objects in the environment, such as, e.g. automated guided vehicles (AGVs) and robotic arms, as well as access points and stations. The environmental signals 150 may be received and processed together with environmental conditions 160 via sensory registers 110. Network information such as network logs, including routes and PDRs, may also be collected or accumulated via sensory registers 110.

A short-term subsystem 120 may receive and store information from sensory registers 110. This information may be used by short-term subsystem 120 to make uncoordinated local time-critical decisions, and may be stored for short periods of time. The short-term subsystem 120 may also provide information to a long-term subsystem 130 and to an output response module 140, where network management actions may be decided based at least in part on the information given by the short-term subsystem 120. Operation of the short-term subsystem 120 may be considered analogous to muscle memory in a biological model. For instance, touching a hot surface would produce an immediate time-critical muscle response to cause movement (e.g. hand or arm) away from the heat source as soon as possible to avoid skin burns.

The long-term subsystem 130 may receive information from sensory registers 110 and from the short-term subsystem 120 associated to different events. The long-term subsystem 130 may process this information and generate learnings to make coordinated non time-critical decisions to ensure overall reliability of the network, which are provided to output response module 140. Learnings are stored in the long-term subsystem 130 for accumulation of knowledge over time. Like the short-term subsystem 120, an analogy may be drawn between the long-term subsystem 130 and biological system reaction to touching a hot surface. Information extracted from short-term biological memory, i.e. senses (smell, sight, hearing . . . ), is processed and stored to understand the conditions that caused the skin to be burned, and is used to prevent this event from happening again in the future.

The output response module 140 may receive input from the short-term subsystem 120 and/or from the long-term subsystem 130, and may generate network configuration (or reconfiguration) commands 170. Network configuration or reconfiguration commands may include, for example: change in transmitting power for an AP, change of STA-AP association for efficient handover, change in Wi-Fi channel due to excessive interference, etc.

Figure 1B:
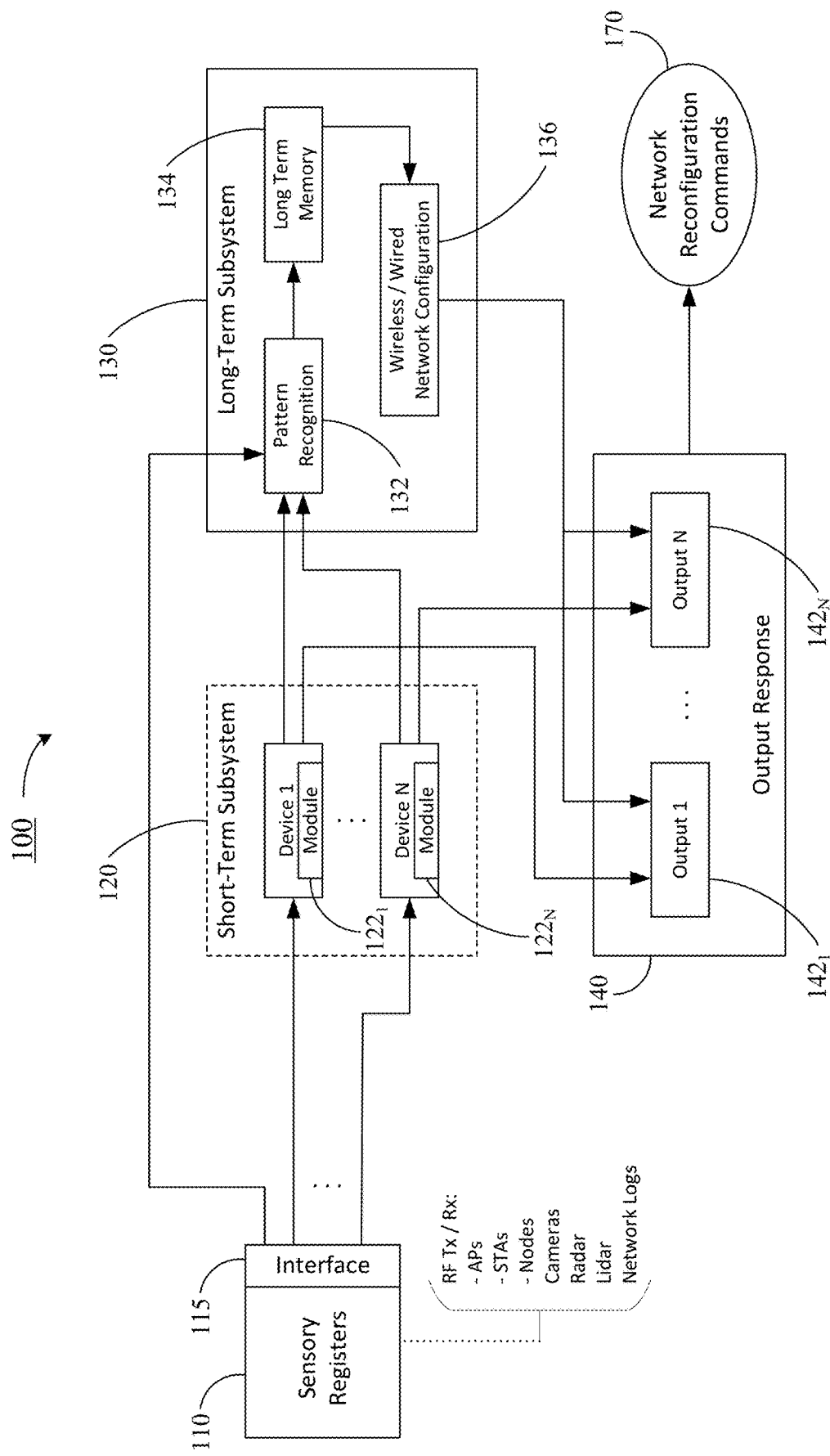

FIG. 1B is block diagram illustrating an example wireless network control system 100 according to one or more embodiments, with reference to components and features described herein including but not limited to the figures and associated description. FIG. 1B includes the same reference numerals as in FIG. 1A, and includes further detail for the short-term subsystem 120, the long-term subsystem 130, and the output response module 140. Consistent with the system components as described with reference to FIG. 1A, the short-term subsystem 120 may make uncoordinated, low latency, local decisions, while the long-term subsystem 130 may use information extracted from short-term devices to detect behavioral patterns and make coordinated non time-critical decisions. Sensory registers 110 may provide data to the short-term subsystem 120 and the long-term subsystem 130 via an interface 115.

The short-term subsystem 120 may include a set of devices (1 . . . N) and a set of short term memory modules $122_1$ . . . $122_N$ which are physically distributed among and associated with the devices (1 . . . N), such as automated guided vehicles (AGVs), access points (APs), etc. Some devices (e.g., access points) may be in a fixed location, while other devices (e.g., AGVs) may be mobile. Thus, these short-term memory modules $122_1$ . . . $122_N$ may not be in the same physical location across the environment. Any particular short-term memory module $122_i$ (of the set of modules $122_1$ . . . $122_N$) does not have observability of other short-term modules in the system. The short-term subsystem 120 may operate via a set of algorithms processing different sensory registers and generating new learnings/memories. Such algorithms may include, for example, pattern recognition for local radio (for local radio management), image processing (using on board camera for collision avoidance), localization (indoor positioning), etc. Each short-term memory module $122_i$ (of the set of modules $122_1$ . . . $122_N$) may provide an output response i to output response module 140, which may also be distributed with the devices as outputs $142_1$ . . . $142_N$ across the physical environment. An output response based on short-term learnings is generated only when the action required is time critical (i.e., the action cannot await coordinated response or action by the central controller) and specific to the device (i.e. information from other devices is not needed to determine the action to be taken). For example, for an autonomous mobile device operating in an indoor industrial environment, a short-term memory module may take care of collision avoidance-related actions. In addition, a short-term memory module may be used to obtain an instantaneous location estimation of the autonomous mobile device. Learnings from the short-term subsystem 120 are discarded after an output response is generated. Before short-term memories are discarded, however, they are shared with the long-term subsystem 130 for further processing.

The long-term subsystem 130 may include a neural network, which may be a recurrent neural network such as a long short-term memory (LSTM) neural network. The neural network may be implemented in a field programmable gate array (FPGA) accelerator; in some embodiments, the neural network may be implemented in a combination of a processor and a FPGA accelerator. The long-term subsystem 130 may collect information from each short-term memory module $122_i$ (of the set of modules $122_1$ . . . $122_N$) and process it to identify patterns (pattern recognition element 132, which may be performed via the neural network) that have an impact on the overall performance of the communications network. To estimate network performance from a sequence of short-term events (from the short-term subsystem 120), the long-term subsystem 130 may continuously update its knowledge of the wireless environment. Unlike short-term subsystem 120, the long-term subsystem 130 may be placed in a single physical location (e.g., in an edge server or in a central network controller), and the learnings extracted from analyzing the data flows from different short-term modules may be stored permanently (long-term memory 134). The long-term subsystem 130 may use the learnings to determine a configuration (or reconfiguration) of the communications network to improve or optimize network performance (network configuration element 136, which may be performed by a processor or logic other than the neural network), which is then provided to the output response module 140 to implement the new network configuration (or reconfiguration). As one example, the long-term subsystem 130 may reconfigure the associations between STAs and APs to enable efficient STA-AP handover.

Figure 2:
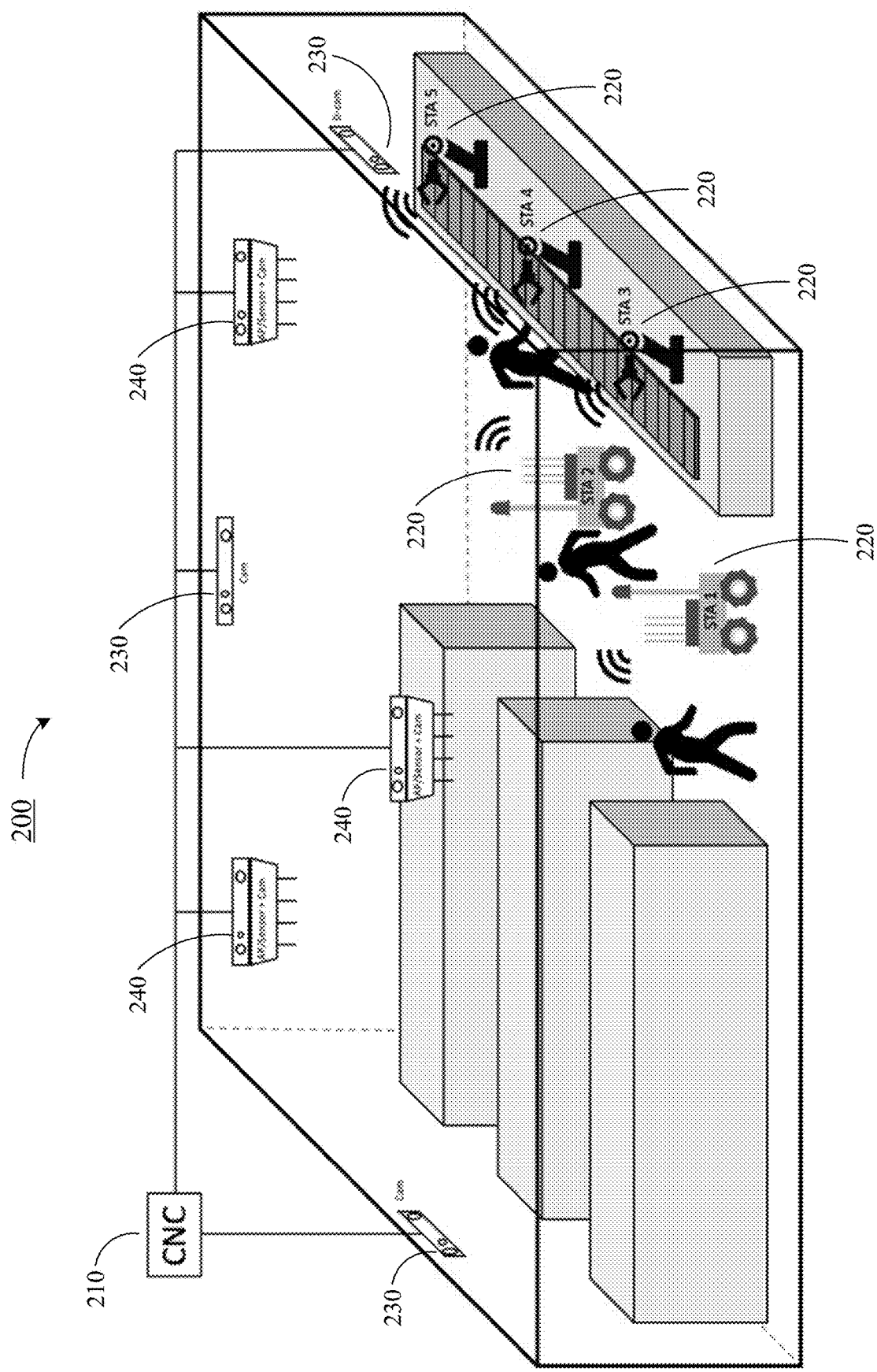
FIG. 2 is a diagram illustrating aspects of an example of a wireless network control system in an industrial environment according to one or more embodiments.

FIG. 2 is a diagram illustrating aspects of an example of a wireless network control system 200 in an industrial environment according to one or more embodiments, with reference to components and features described herein including but not limited to the figures and associated description. In the scenario illustrated in FIG. 2, an industrial wireless network may be formed by a central network controller (CNC) 210, multiple access points (AP), multiple stations (STAs) 220 (labeled STA1 through STA5), and multiple surveillance cameras 230; in some instances, cameras may be bundled with access points and sensors to form AP-cam units 240. The CNC 210 may coordinate actions and communications occurring in the whole network. The access points 240 may be connected to the CNC 210 and provide wireless connectivity to all stations 220 in the environment. The stations 220 may be located in moving objects such as automated guided vehicles (AGVs) or in static objects such as robotic arms. Reliable communications between access points 240 and stations 220 are necessary to service the AGVs and robotic arms. The cameras 230 and the AP-cam units 240, as deployed throughout the environment, may monitor the environment to track objects and assets. In some embodiments, APs may be separate from cameras.

According to embodiments, the wireless network control system 200 may have a hierarchical memory system including a short-term subsystem 120 (FIGS. 1A-1B), already discussed, and a long-term subsystem 130 (FIGS. 1A-1B), already discussed. In the industrial example of FIG. 2, the short-term subsystem 120 may have short-term memory formed by learnings extracted from sensor data processed by access points 240 and stations 230, and the long-term subsystem 130 may be incorporated into the CNC 210. For example, stations configured in sniffer mode may listen to each other while they are not scheduled for any transmission or data reception. In this case, the short-term learnings may consist of time-stamped received signal strength indication (RSSI) maps generated for each of stations and stored in the access points. All STAs connected to an AP may share their RSSI along with their location coordinates. This information may be used to generate a RSSI map. The CNC 210 may collect this information together with object tracking information from cameras 230 (and AP-cams 240), and may determine relationships between RSSI values and object locations relative to the transmitter stations (APs) and receiver stations (STAs). For example, by overhearing other STA transmissions, interference from STAs operating in the same channel may be predicted. This may be used to provide an optimal power allocation and wireless communication scheduling policy that minimizes co-channel interference. Additionally, based on the RSSI maps, efficient STA-AP handover may be devised for high reliable wireless communications.

Figure 3:
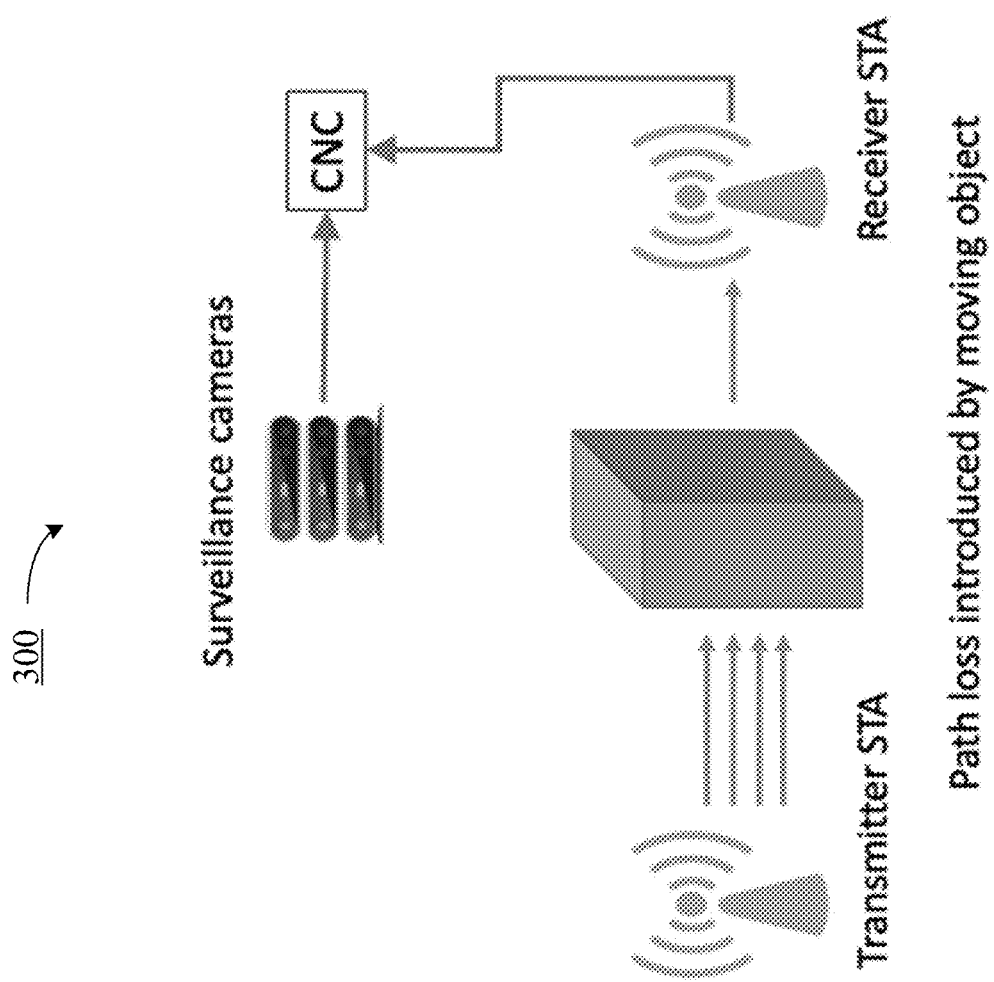
FIG. 3 is a diagram illustrating aspects of an example of data enhancement in a wireless network control system according to one or more embodiments.

FIG. 3 is a diagram 300 illustrating an example of object classification feature enrichment in wireless network control system according to one or more embodiments, with reference to components and features described herein including but not limited to the figures and associated description. As shown in FIG. 3, a central network controller (CNC) having a long-term subsystem may collect information from cameras (such as, e.g., a surveillance camera system) and stations (STAs). A received image may be processed to classify materials and objects in the environment. The surveillance camera system may track objects and determine that a moving object is blocking the line of sight of transmission between two stations. The CNC may extract RSSIs from received signals by the receiver STA. The CNC may estimate the path loss introduced by the moving object by measuring attenuation in RSSI. Upon learning the path loss associated to a particular object in the environment, the CNC may, for example, detect when the same object is about to block the line-of-sight (LOS) between a STA and an AP (using the camera system) and associate the STA to a different AP to avoid the LOS blockage.

Figure 4A:
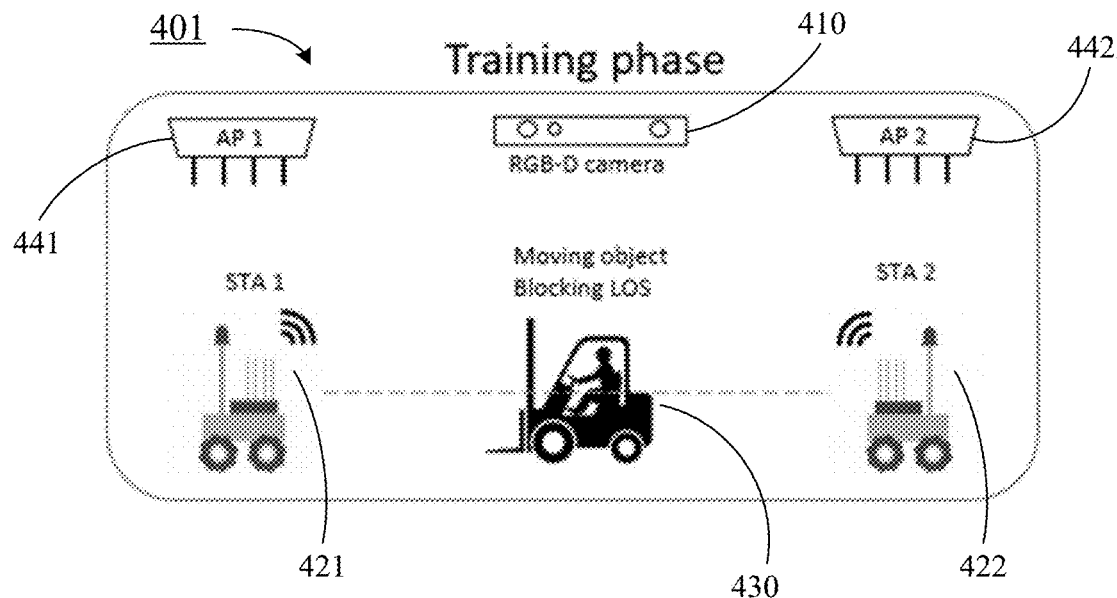
FIGS. 4A-4B provide diagrams illustrating aspects of an example of training and inference phases for a wireless network control system according to one or more embodiments.
Figure 4B:
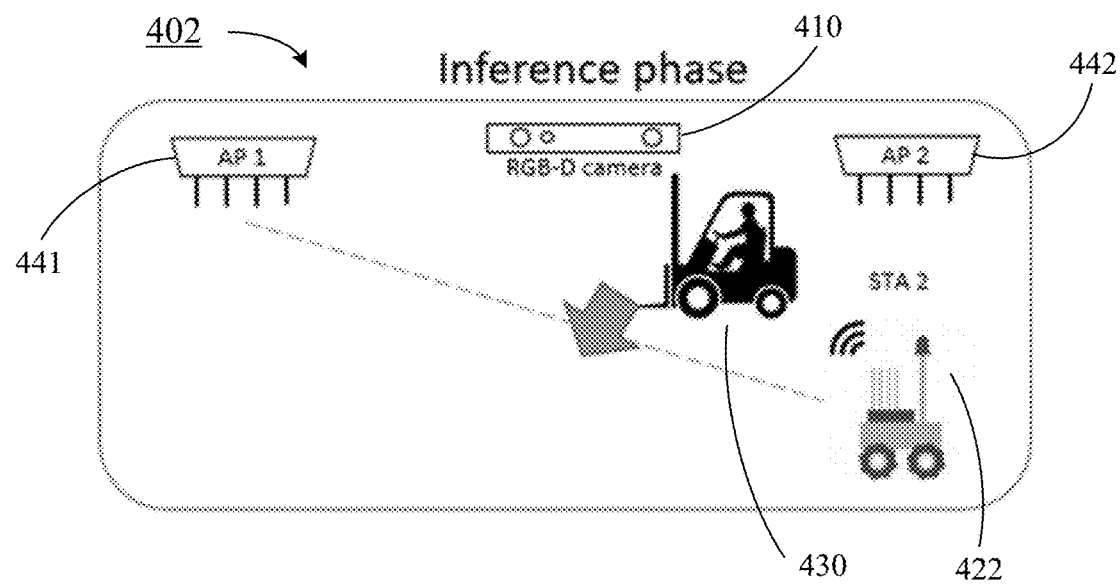

The long-term subsystem 130 (FIGS. 1A-1B, already discussed) may include a neural network (NN) $f_\theta$ with parameters $\theta$ (NN weights obtained after training the NN) to implement the long-term memory learning aspects. FIGS. 4A-4B provide diagrams illustrating aspects of an example of training and inference phases for a neural network in a wireless network control system according to one or more embodiments, with reference to components and features described herein including but not limited to the figures and associated description. Training may be carried out via self-supervised learning. As shown in FIG. 4A, a wireless network training environment 401 may include one or more RGB-D (imaging plus depth sensor) cameras 410, a pair of stations 421, 422, and one or more moving objects 430 that may block a line of sight between stations 421 and 422. During the training phase, RGB-D cameras 410 may detect and track stations 421, 422 and moving objects 430 in the environment and may obtain, for each tracked element, its unique identifier "i" and its 3D position in the space $x_{i,t} \in \mathbb{R}^3$ with respect to a known fixed inertial frame and bounding box $b_{i,t} \in \mathbb{R}^3$. The sub-index i references the unique identifier for the object or STA, and the sub-index t references that the data was timestamped at time t. The inertial frame may be obtained in a previous camera calibration phase that uses well known extrinsic camera calibration approaches to determine the position of all the cameras in the environment with respect to a common reference frame that may be determined at calibration time.

A central network controller (CNC, not shown in the figure), which may incorporate the long-term subsystem 130, may collect channel state information, such as RSSIs for each pair of network stations (STAs 421,422) and access points (APs 441, 442), $\psi_t \in \mathbb{R}^{N \times N-1}$, where N corresponds to the number of managed devices in the communications network. The CNC may also collect configuration parameters from each of the communications network devices (stations and access points) $c_t \in \mathbb{R}^{N \times M}$ where M is the number of configuration parameters that the communications network devices can use. The gathered information may be organized into tuples $(x_t, b_t, c, \psi)_t$ that are used to train a fully connected neural network (e.g., long-term subsystem 130) that learns a mapping from tracked positions of the detected known objects to the expected RSSI of all the network devices, conditioned by the configuration parameters:

$$f_\theta(i,x,b,c) \to \hat{\psi}.$$

By tracking positions of stations 421, 422 and moving objects 430, camera 410 may identify when one of the moving objects is blocking a line-of-sight (LOS) between stations 421 and 422 (e.g., STA1 and STA2 as illustrated in FIG. 4A). When the LOS between the stations 421 and 422 is blocked by one of the moving objects 430, the path loss produced depends on the material of the occluding object, the network configuration and the position of the object. Attenuation introduced by a moving object 430 may be computed at the CNC using RSSI readings collected by the stations. The neural network may then be trained based on the data set formed by moving object/image-associated attenuation.

Once the neural network of long-term subsystem 130 has been trained, path loss from an object may be estimated by providing the object's position, unique identifier, bounding box, and network configuration parameters to the neural network. As shown in FIG. 4B, a wireless network operating environment 402 may be the same or similar to training environment 401, and may include one or more RGB-D (imaging plus depth sensor) cameras 410, multiple stations (such as, e.g., station 422), one or more moving objects 430, and multiple access points (such as, e.g., access points 441, 442). In the scenario depicted in FIG. 4B, station 422 (STA2, as illustrated in FIG. 4B) may be associated with (e.g., connected wirelessly to) access point 441 (AP1, as illustrated in the figure). A camera 410 may track the position of stations and moving object 430, and may predict that a moving object 430 will block the line-of-sight between access point 441 and station 422. Using the neural network of long-term subsystem 130, the attenuation of the signal between access point 441 and station 422 introduced by the moving object 430 may be predicted. The input may be defined by the moving object image from camera 410. Based on the predicted attenuation, long-term subsystem 130 may determine appropriate network configuration parameters to adjust to account for the predicted attenuation. For example, the long-term subsystem 130 may determine that the station 422 should be switched over and connected to access point 442 (AP2, as illustrated) where the LOS between the devices is not blocked by moving object 430. As another example, the long-term subsystem 130 may determine that the transmitting power for the station 422 should be increased to overcome the attenuation caused by the moving object 430.

During inference (i.e., during normal runtime operation), it may happen that multiple stations and multiple objects are tracked. The neural network in the long-term subsystem 130 that is trained to predict RSSI values considers only the effects by a single object, and therefore the system does not model combined effects that multiple objects can have on one another. This approximation improves the computational complexity and provides a boundary to the problem complexity enabling scalability to many objects. To consider all of the objects to obtain the approximated RSSI matrix $\hat{\psi}$, the neural network may be used for each tracked object and a set of K predictions may be obtained. The resulting prediction may be computed as the element-wise minimum of the obtained RSSI matrix set. This operation can be expressed as follows:

$$\Psi \in \mathbb{R}^{K \times N \times M},$$

$$\Psi_{ijk} \in \mathbb{R},$$

$$\Psi_i = f_\theta(i, x_i, b_i, c) \forall\, i \in \{0, K-1\},$$

$$\hat{\psi}_{jk} = \min_i \Psi_{ijk}$$

To obtain the set of K predictions, the neural network may be run multiple times and the minimum RSSI value computed for each pair of network devices. In embodiments, multiple runs may be performed in parallel without affecting the computation time. Accordingly, the neural network may act as a memory stored in the long-term subsystem 130. The long-term subsystem 130 may use the neural network to search for the best network configuration to optimize communications quality under the observed operating state. RSSIs collected in a station associated to other station transmissions may be used to determine optimal station transmission parameters to minimize interference from other devices (e.g., as may be determined by the short-term subsystem 120).

In one or more alternative embodiments, mobile stations may collect RSSIs originating from static access points (with known locations) to build and store RSSI maps of the environment. For example, stations associated with mobile automated guided vehicles would be aware of their locations within the environment. Location information may be shared with the access points where RSSI maps may be generated and stored in real time. In one example, the RSSI maps may be stored in the short-term subsystem 120. Access points may relay these RSSI maps to the long-term subsystem 130, which may be incorporated in a central network controller (CNC). There, maps may be associated with the time of the day, day of the year, temperature and humidity levels in the atmosphere (via data captured by other sensors in the network) and the location of moving objects and other assets (as classified and tracked by a surveillance camera system).

The long-term subsystem 130 may generate and store generic path loss models that may be used for applications such as indoor positioning and optimal network coverage for high reliable communications. The long-term subsystem 130 may also record one or more sequences of events that cause significant drops in recorded RSSI, so as to act upon an occurrence of such events in the future. This stored information may be vital to predicting RSSI behavior and avoid loss in Quality of Service (QoS). Upon significant changes in the environment, such as, e.g., a layout change in a factory, the generated generic path loss models and learnings may be disregarded, and new generic path loss models generated based on the new environment.

Figure 5:
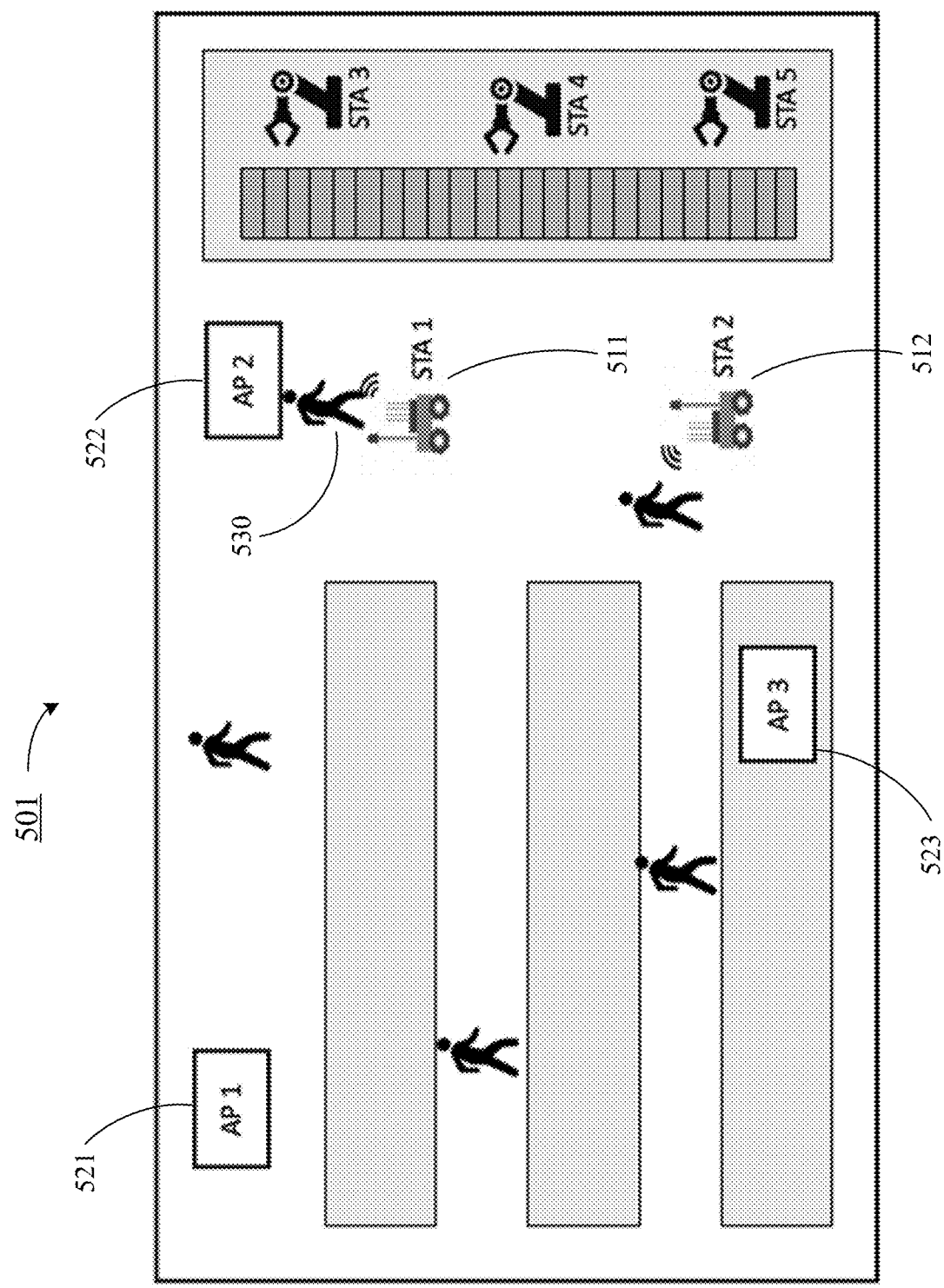
FIG. 5 is a diagram illustrating an example of application of a wireless network control system in an industrial environment according to one or more embodiments.

FIG. 5 is a diagram illustrating an example of application of RSSI maps for a wireless network control system in an industrial environment 501 according to one or more embodiments, with reference to components and features described herein including but not limited to the figures and associated description. The industrial environment 501 may include multiple stations, including mobile stations 511, 512 (illustrated as STA1 and STA2 in FIG. 5), access points 521-523 (illustrated as AP1 though AP3 in FIG. 5), and workers performing various tasks in the environment. The mobile stations 511 and 512 may collect RSSIs received by the access points and send the RSSI information to long-term subsystem 130, which may be incorporated within a central network controller (CNC, not shown) for the network. At a particular point in time, the mobile station 511 (STA1) may record a low RSSI from access point 522 (AP2). The CNC may detect (via a camera surveillance system, not shown) the presence of a worker 530 blocking the LOS between mobile station 511 and access point 522, and may, via the long-term subsystem 130, associate the low RSSI reading to this occurrence. Based on accumulated learnings in the long-term subsystem 130 for these types of events, the CNC may react by automatically increasing the transmission power of access point 522 to increase the RSSI and preserve the quality of service (QoS) in the network. Alternatively, the CNC may determine that the LOS between mobile station 511 and access point 521 (AP1) is not blocked and react by automatically switching station 511 to connect to access point 521 to preserve network QoS.

In one or more embodiments, other channel state information may be collected and utilized by the long-term subsystem 130 in addition to, or in place of, RSSI data from device transmissions. Such channel state information may be added to the RSSI maps, already discussed, or may be used to generate channel state maps, for use in performing device positioning within the network or predicting network QoS. Channel state information may be used, for example, to estimate frequency selectivity of the wireless channel and delay spread. This information may be used to determine if the link offers the required QoS. A low QoS may trigger a change in the STA-AP association. Channel state information may also be used for enabling more sophisticated radio frequency (RF) fingerprinting indoor positioning algorithms.

Figure 6A:
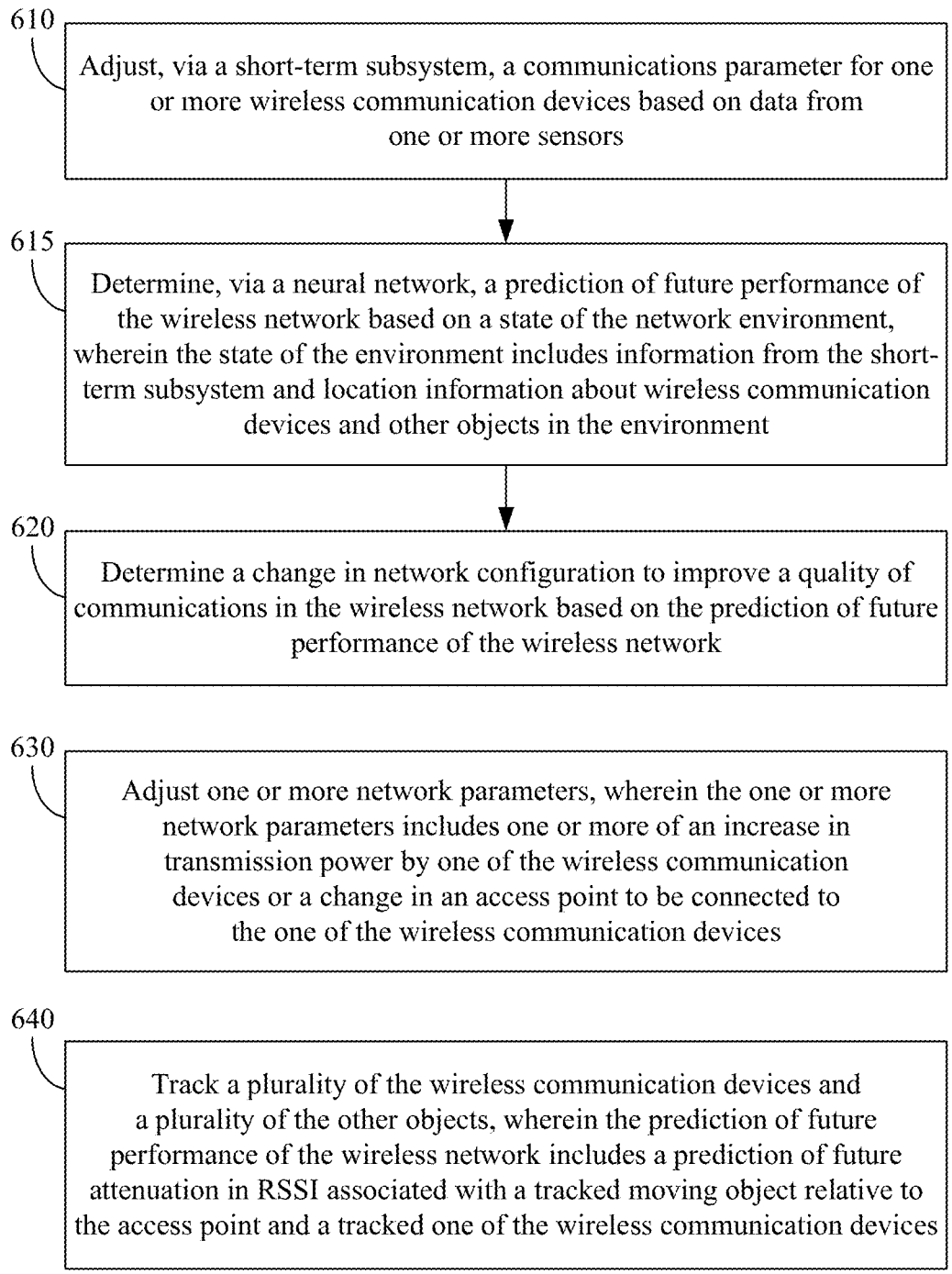
FIGS. 6A-6B provide flowcharts illustrating operation of an example of a wireless network control system according to one or more embodiments.
Figure 6B:
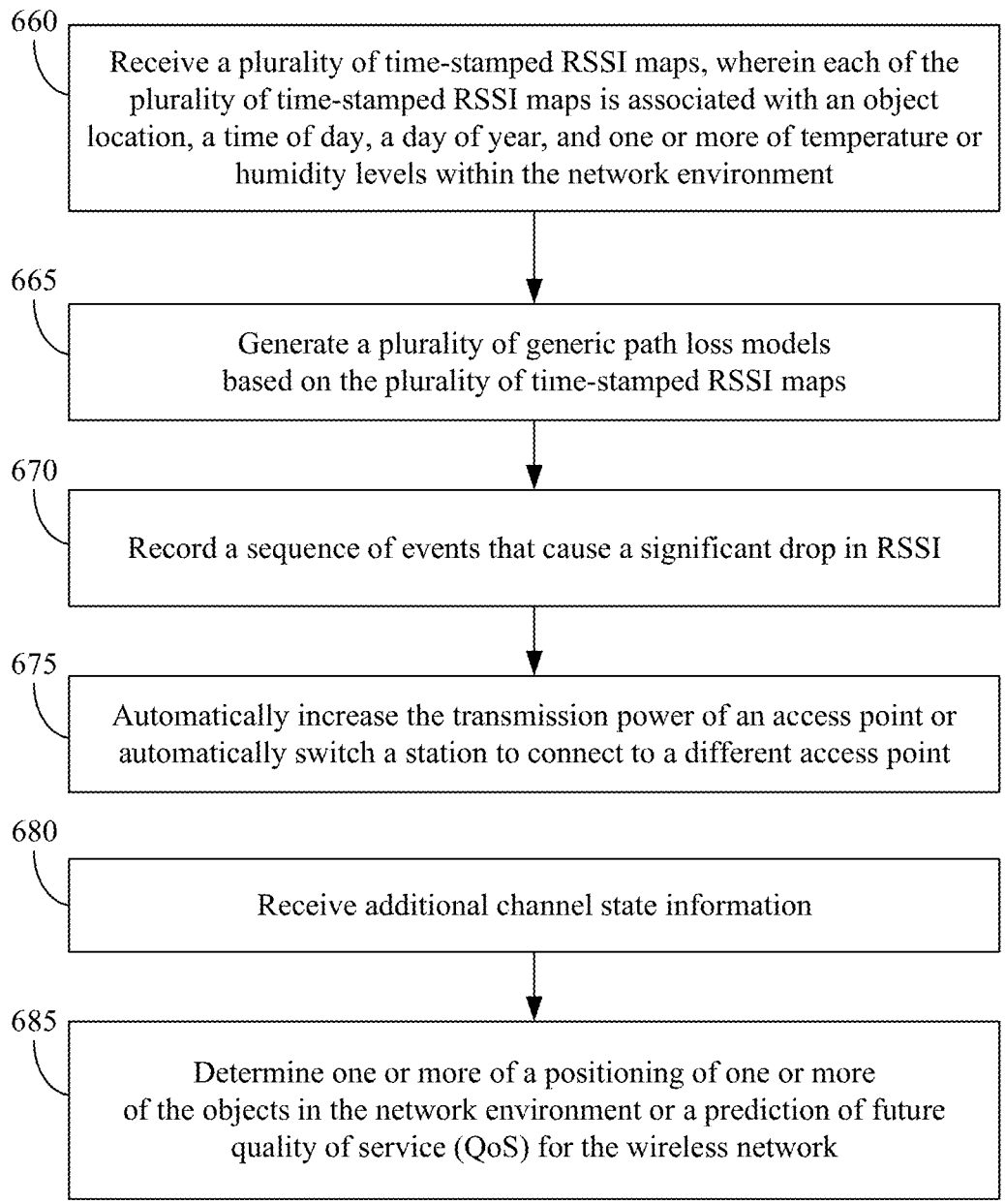

FIGS. 6A-6B provide flowcharts illustrating a process 600 for operation of an example of a wireless network control system according to one or more embodiments, with reference to components and features described herein including but not limited to the figures and associated description. Process 600 may be implemented in wireless network control system 100 described herein with reference to FIGS. 1A-1B, already discussed. More particularly, process 600 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in process 600 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Turning to FIG. 6A, illustrated processing block 610 provides for adjusting, via a short-term subsystem, a communications parameter for one or more wireless communication devices based on data from one or more sensors. The short-term subsystem may include a plurality of short term memory modules distributed among communication devices. Adjusting a communications parameter may include, for example, increasing transmission power to provide a desired QoS. As another example, enablement of packet duplication in the presence of detected interference may provide for high reliable communications through redundancy (via operating in two frequency channels in parallel).

Illustrated processing block 615 provides for determining, via a neural network, a prediction of future performance of the wireless network based on a state of the network environment, wherein the state of the network environment includes information from the short-term subsystem and location information about wireless communication devices and other objects in the environment.

Illustrated processing block 620 provides for determining a change in network configuration to improve a quality of communications in the wireless network based on the prediction of future performance of the wireless network.

Illustrated processing block 630 provides for adjusting one or more network parameters, wherein the one or more network parameters includes one or more of an increase in transmission power by one of the wireless communication devices or a change in an access point to be connected to the one of the wireless communication devices.

Illustrated processing block 640 provides for tracking a plurality of the wireless communication devices and a plurality of the other objects, wherein the prediction of future performance of the wireless network includes a prediction of future attenuation in RSSI associated with a tracked moving object relative to the access point and a tracked one of the wireless communication devices.

Turning to FIG. 6B, illustrated processing block 660 provides for receiving a plurality of time-stamped RSSI maps, wherein each of the plurality of time-stamped RSSI maps is associated with an object location, a time of day, a day of year, and one or more of temperature or humidity levels within the network environment. RSSI maps may be based on RSSI data originating from static access points (with known locations) within the network the environment. Illustrated processing block 665 provides for generating a plurality of generic path loss models based on the plurality of time-stamped RSSI maps. Illustrated processing block 670 provides for recording a sequence of events that cause a significant drop in RSSI. Illustrated processing block 675 provides for automatically increasing the transmission power of an access point or automatically switching a station to connect to a different access point.

Illustrated processing block 680 provides for receiving additional channel state information. Channel state information may be used to estimate frequency selectivity of the wireless channel and delay spread. This information could be used to determine if the link offers the required QoS. A low QoS may trigger a change in the STA-AP association. Channel state information may also be used for enabling more sophisticated RF fingerprinting indoor positioning algorithms. Illustrated processing block 685 provides for determining, via the neural network, one or more of a positioning of one or more of the objects in the network environment or a prediction of future quality of service (QoS) for the wireless network.

Figure 7:
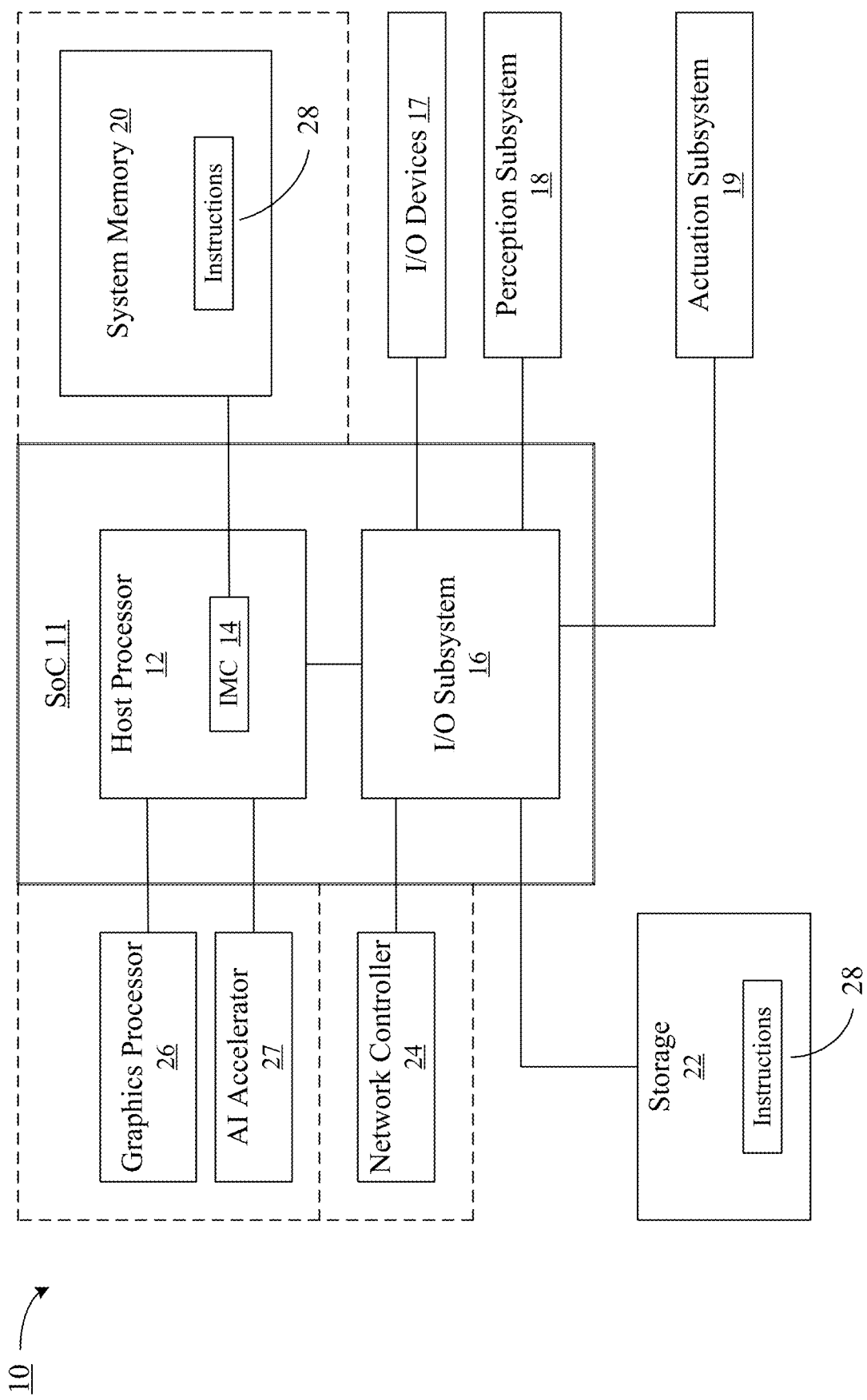
FIG. 7 is a block diagram illustrating an example of a performance-enhanced computing system according to one or more embodiments.

FIG. 7 shows a block diagram illustrating an example computing system 10 for adapting a network configuration based on the local network environment according to one or more embodiments, with reference to components and features described herein including but not limited to the figures and associated description. The system 10 may generally be part of an electronic device/platform having computing and/or communications functionality (e.g., server, cloud infrastructure controller, database controller, notebook computer, desktop computer, personal digital assistant/PDA, tablet computer, convertible tablet, smart phone, etc.), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), robotic functionality (e.g., autonomous robot), Internet of Things (IoT) functionality, etc., or any combination thereof. In the illustrated example, the system 10 may include a host processor 12 (e.g., central processing unit/CPU) having an integrated memory controller (IMC) 14 that may be coupled to system memory 20. The host processor 12 may include any type of processing device, such as, e.g., microcontroller, microprocessor, RISC processor, ASIC, etc., along with associated processing modules or circuitry. System memory 20 may include any non-transitory machine- or computer-readable storage medium such as RAM, ROM, PROM, EEPROM, firmware, flash memory, etc., configurable logic such as, for example, PLAs, FPGAs, CPLDs, fixed-functionality hardware logic using circuit technology such as, for example, ASIC, CMOS or TTL technology, or any combination thereof suitable for storing instructions 28.

The system 10 may also include an input/output (I/O) subsystem 16. The I/O subsystem 16 may communicate with for example, one or more input/output (I/O) devices 17, a network controller 24 (e.g., wired and/or wireless NIC), and storage 22. Storage 22 may be comprised of any appropriate non-transitory machine- or computer-readable memory type (e.g., flash memory, DRAM, SRAM (static random access memory), solid state drive (SSD), hard disk drive (HDD), optical disk, etc.). Storage 22 may include mass storage. In some embodiments, the host processor 12 and/or the I/O subsystem 16 may communicate with storage 22 (all or portions thereof) via a network controller 24. In some embodiments, the system 10 may also include a graphics processor 26 (e.g., graphics processing unit/GPU) and an AI accelerator 27. In some embodiments, the system 10 may also include a perception subsystem 18 (e.g., including one or more sensors and/or cameras) and/or an actuation subsystem 19. In an embodiment, system 10 may also include a vision processing unit (VPU), not shown.

The host processor 12 and the I/O subsystem 16 may be implemented together on a semiconductor die as a system on chip (SoC) 11, shown encased in a solid line. The SoC 11 may therefore operate as a computing apparatus for automated network control. In some embodiments, The SoC 11 may also include one or more of the system memory 20, the network controller 24, the graphics processor 26 and/or the AI accelerator 27 (shown encased in dotted lines). In some embodiments, the SoC 11 may also include other components of system 10.

The host processor 12, the I/O subsystem 16, the graphics processor 26, the AI accelerator 27 and/or the VPU may execute program instructions 28 retrieved from the system memory 20 and/or the storage 22 to perform one or more aspects of process 600 as described herein with reference to FIGS. 6A-6B. Thus, execution of the instructions 28 may cause the SoC 11 to adjust, via a short-term subsystem, a communications parameter for one or more wireless communication devices based on data from one or more sensors, determine, via a neural network, a prediction of future performance of the wireless network based on a state of the network environment, wherein the state of the network environment includes information from the short-term subsystem and location information about wireless communication devices and other objects in the environment, and determine, via the neural network, a change in network configuration to improve a quality of communications in the wireless network based on the prediction of future performance of the wireless network. The system 10 may implement one or more aspects of the wireless network control system 100, the short-term subsystem 120, the long-term subsystem 130, and/or the output response module 140 as described herein with reference to FIGS. 1A-1B, 2, 3, 4A-4B and 5. The system 10 is therefore considered to be performance-enhanced at least to the extent that network quality may be improved by adapting a network configuration based on the local network environment.

Computer program code to carry out the processes described above may be written in any combination of one or more programming languages, including an object-oriented programming language such as JAVA, JAVASCRIPT, PYTHON, SMALLTALK, C++ or the like and/or conventional procedural programming languages, such as the "C" programming language or similar programming languages, and implemented as the program instructions 28. Additionally, the program instructions 28 may include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, microprocessor, etc.).

The I/O devices 17 may include one or more of input devices, such as a touch-screen, keyboard, mouse, cursor-control device, touch-screen, microphone, digital camera, video recorder, camcorder, biometric scanners and/or sensors; input devices may be used to enter information and interact with the system 10 and/or with other devices. The I/O devices 17 may also include one or more of output devices, such as a display (e.g., touch screen, liquid crystal display/LCD, light emitting diode/LED display, plasma panels, etc.), speakers and/or other visual or audio output devices. Input and/or output devices may be used, e.g., to provide a user interface.

Figure 8:
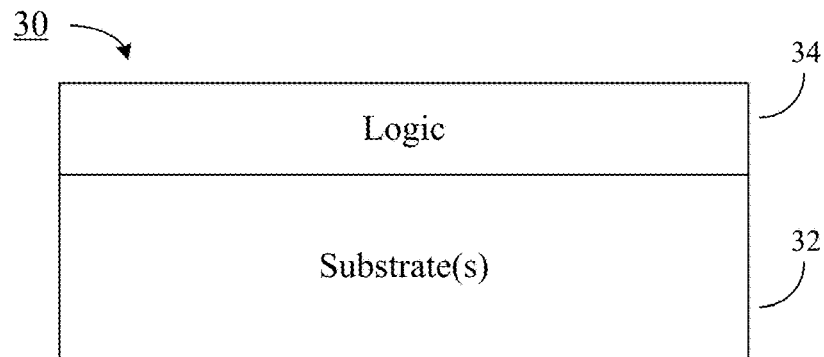
FIG. 8 is a block diagram illustrating an example of a semiconductor apparatus according to one or more embodiments.

FIG. 8 shows a block diagram illustrating an example semiconductor apparatus 30 for adapting a network configuration based on the local network environment according to one or more embodiments, with reference to components and features described herein including but not limited to the figures and associated description. The semiconductor apparatus 30 may be implemented, e.g., as a chip, die, or other semiconductor package. The semiconductor apparatus 30 may include one or more substrates 32 comprised of, e.g., silicon, sapphire, gallium arsenide, etc. The semiconductor apparatus 30 may also include logic 34 comprised of, e.g., transistor array(s) and other integrated circuit (IC) components) coupled to the substrate(s) 32. The logic 34 may be implemented at least partly in configurable logic or fixed-functionality logic hardware. The logic 34 may implement system on chip (SoC) 11 described above with reference to FIG. 7. The logic 34 may implement one or more aspects of the processes described above, including process 600 as described herein with reference to FIGS. 6A-6B to adjust, via a short-term subsystem, a communications parameter for one or more wireless communication devices based on data from one or more sensors, determine, via a neural network, a prediction of future performance of the wireless network based on a state of the network environment, wherein the state of the network environment includes information from the short-term subsystem and location information about wireless communication devices and other objects in the environment, and determine, via the neural network, a change in network configuration to improve a quality of communications in the wireless network based on the prediction of future performance of the wireless network as described herein with reference to FIGS. 6A-6B. The logic 34 may implement one or more aspects of the wireless network control system 100, the short-term subsystem 120, the long-term subsystem 130, and/or the output response module 140 as described herein with reference to FIGS. 1A-1B, 2, 3, 4A-4B and 5. The apparatus 30 is therefore considered to be performance-enhanced at least to the extent that network quality may be improved by adapting a network configuration based on the local network environment.

The semiconductor apparatus 30 may be constructed using any appropriate semiconductor manufacturing processes or techniques. For example, the logic 34 may include transistor channel regions that are positioned (e.g., embedded) within substrate(s) 32. Thus, the interface between the logic 34 and the substrate(s) 32 may not be an abrupt junction. The logic 34 may also be considered to include an epitaxial layer that is grown on an initial wafer of the substrate(s) 34.

Figure 9:
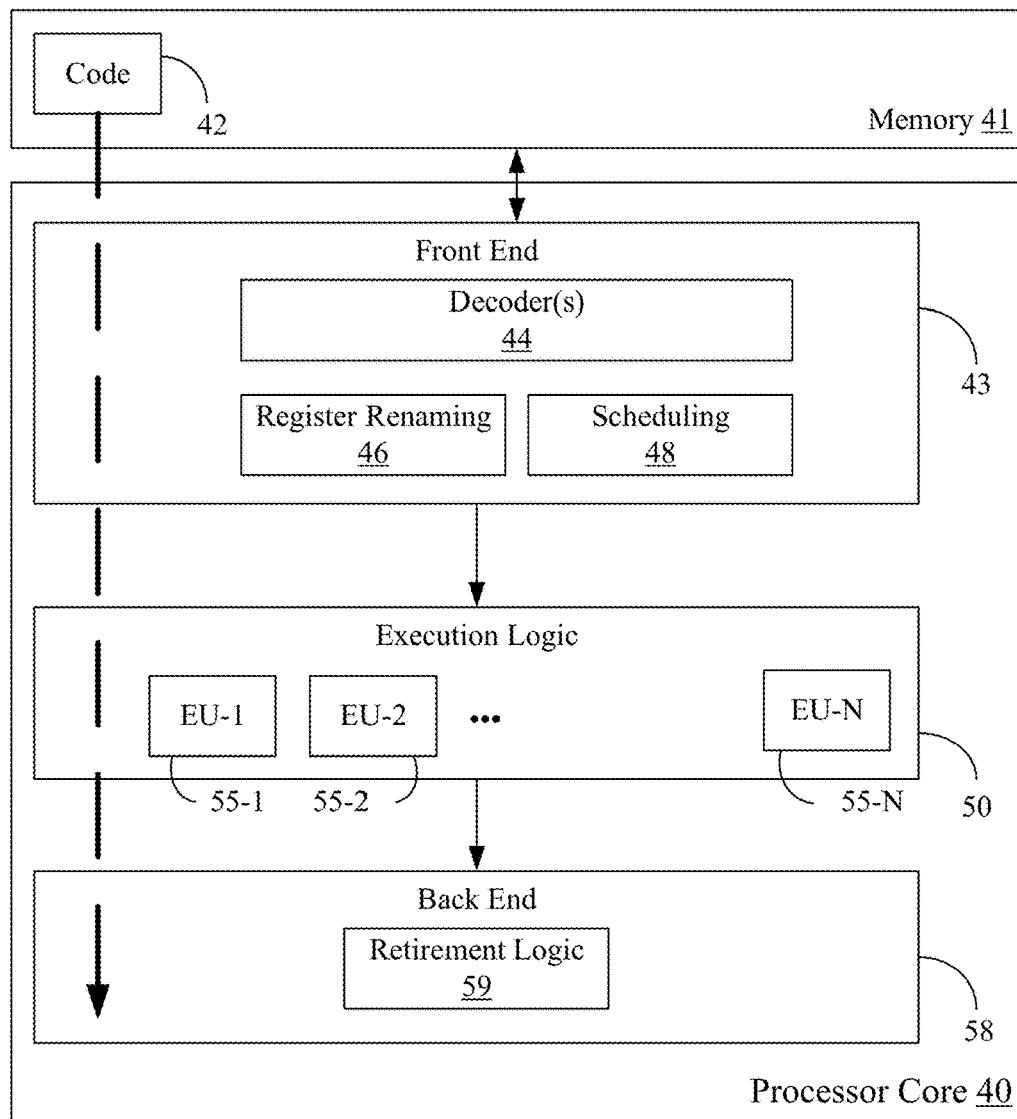
FIG. 9 is a block diagram illustrating an example of a processor according to one or more embodiments.

FIG. 9 is a block diagram illustrating an example processor core 40 according to one or more embodiments, with reference to components and features described herein including but not limited to the figures and associated description. The processor core 40 may be the core for any type of processor, such as a micro-processor, an embedded processor, a digital signal processor (DSP), a network processor, or other device to execute code. Although only one processor core 40 is illustrated in FIG. 9, a processing element may alternatively include more than one of the processor core 40 illustrated in FIG. 9. The processor core 40 may be a single-threaded core or, for at least one embodiment, the processor core 40 may be multithreaded in that it may include more than one hardware thread context (or "logical processor") per core.

FIG. 9 also illustrates a memory 41 coupled to processor core 40. The memory 41 may be any of a wide variety of memories (including various layers of memory hierarchy) as are known or otherwise available to those of skill in the art. The memory 41 may include one or more code 42 instruction(s) to be executed by processor core 40. The code 42 may implement one or more aspects of the process 600 described above. The processor core 40 may implement one or more aspects of the wireless network control system 100, the short-term subsystem 120, the long-term subsystem 130, and/or the output response module 140 as described herein with reference to FIGS. 1A-1B, 2, 3, 4A-4B and 5. The processor core 40 follows a program sequence of instructions indicated by the code 42. Each instruction may enter a front end portion 43 and be processed by one or more decoders 44. The decoder 44 may generate as its output a micro operation such as a fixed width micro operation in a predefined format, or may generate other instructions, microinstructions, or control signals which reflect the original code instruction. The illustrated front end portion 43 also includes register renaming logic 46 and scheduling logic 48, which generally allocate resources and queue the operation corresponding to the convert instruction for execution.

The processor core 40 is shown including execution logic 50 having a set of execution units 55-1 through 55-N. Some embodiments may include a number of execution units dedicated to specific functions or sets of functions. Other embodiments may include only one execution unit or one execution unit that can perform a particular function. The illustrated execution logic 50 performs the operations specified by code instructions.

After completion of execution of the operations specified by the code instructions, back end logic 58 retires the instructions of code 42. In one embodiment, the processor core 40 allows out of order execution but requires in order retirement of instructions. Retirement logic 59 may take a variety of forms as known to those of skill in the art (e.g., re-order buffers or the like). In this manner, the processor core 40 is transformed during execution of the code 42, at least in terms of the output generated by the decoder, the hardware registers and tables utilized by the register renaming logic 46, and any registers (not shown) modified by the execution logic 50.

Although not illustrated in FIG. 9, a processing element may include other elements on chip with the processor core 40. For example, a processing element may include memory control logic along with the processor core 40. The processing element may include I/O control logic and/or may include I/O control logic integrated with memory control logic. The processing element may also include one or more caches.

Figure 10:
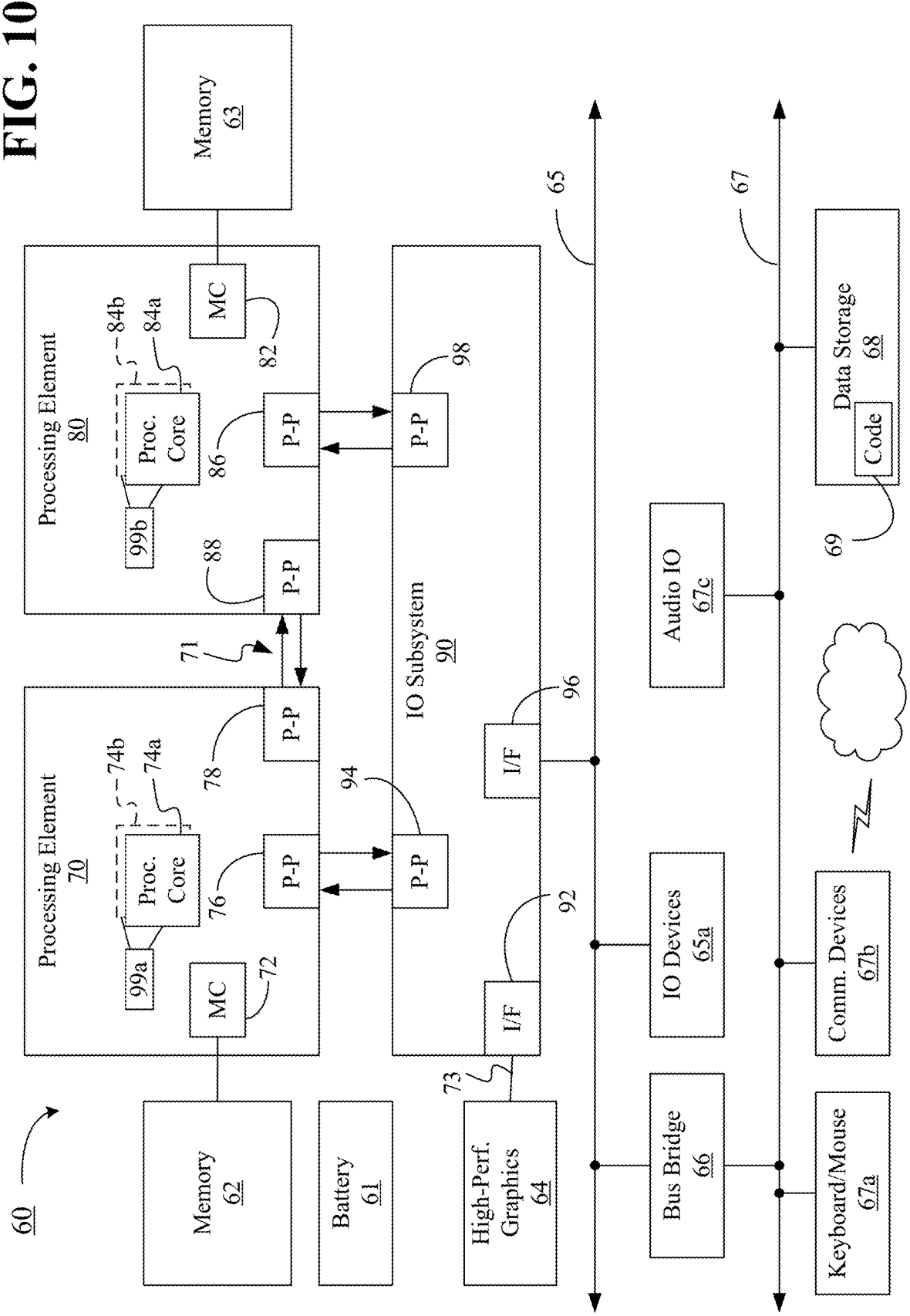
FIG. 10 is a block diagram illustrating an example of a multiprocessor-based computing system according to one or more embodiments.

FIG. 10 is a block diagram illustrating an example of a multi-processor based computing system 60 according to one or more embodiments, with reference to components and features described herein including but not limited to the figures and associated description. The multiprocessor system 60 includes a first processing element 70 and a second processing element 80. While two processing elements 70 and 80 are shown, it is to be understood that an embodiment of the system 60 may also include only one such processing element.

The system 60 is illustrated as a point-to-point interconnect system, wherein the first processing element 70 and the second processing element 80 are coupled via a point-to-point interconnect 71. It should be understood that any or all of the interconnects illustrated in FIG. 10 may be implemented as a multi-drop bus rather than point-to-point interconnect.

As shown in FIG. 10, each of the processing elements 70 and 80 may be multicore processors, including first and second processor cores (i.e., processor cores 74a and 74b and processor cores 84a and 84b). Such cores 74a, 74b, 84a, 84b may be configured to execute instruction code in a manner similar to that discussed above in connection with FIG. 9.

Each processing element 70, 80 may include at least one shared cache 99a, 99b. The shared cache 99a, 99b may store data (e.g., instructions) that are utilized by one or more components of the processor, such as the cores 74a, 74b and 84a, 84b, respectively. For example, the shared cache 99a, 99b may locally cache data stored in a memory 62, 63 for faster access by components of the processor. In one or more embodiments, the shared cache 99a, 99b may include one or more mid-level caches, such as level 2 (L2), level 3 (L3), level 4 (L4), or other levels of cache, a last level cache (LLC), and/or combinations thereof.

While shown with only two processing elements 70, 80, it is to be understood that the scope of the embodiments are not so limited. In other embodiments, one or more additional processing elements may be present in a given processor. Alternatively, one or more of the processing elements 70, 80 may be an element other than a processor, such as an accelerator or a field programmable gate array. For example, additional processing element(s) may include additional processors(s) that are the same as a first processor 70, additional processor(s) that are heterogeneous or asymmetric to processor a first processor 70, accelerators (such as, e.g., graphics accelerators or digital signal processing (DSP) units), field programmable gate arrays, or any other processing element. There can be a variety of differences between the processing elements 70, 80 in terms of a spectrum of metrics of merit including architectural, micro architectural, thermal, power consumption characteristics, and the like. These differences may effectively manifest themselves as asymmetry and heterogeneity amongst the processing elements 70, 80. For at least one embodiment, the various processing elements 70, 80 may reside in the same die package.

The first processing element 70 may further include memory controller logic (MC) 72 and point-to-point (P-P) interfaces 76 and 78. Similarly, the second processing element 80 may include a MC 82 and P-P interfaces 86 and 88. As shown in FIG. 10, MC's 72 and 82 couple the processors to respective memories, namely a memory 62 and a memory 63, which may be portions of main memory locally attached to the respective processors. While the MC 72 and 82 is illustrated as integrated into the processing elements 70, 80, for alternative embodiments the MC logic may be discrete logic outside the processing elements 70, 80 rather than integrated therein.

The first processing element 70 and the second processing element 80 may be coupled to an I/O subsystem 90 via P-P interconnects 76 and 86, respectively. As shown in FIG. 10, the I/O subsystem 90 includes P-P interfaces 94 and 98. Furthermore, the I/O subsystem 90 includes an interface 92 to couple I/O subsystem 90 with a high performance graphics engine 64. In one embodiment, a bus 73 may be used to couple the graphics engine 64 to the I/O subsystem 90. Alternately, a point-to-point interconnect may couple these components.

In turn, the I/O subsystem 90 may be coupled to a first bus 65 via an interface 96. In one embodiment, the first bus 65 may be a Peripheral Component Interconnect (PCI) bus, or a bus such as a PCI Express bus or another third generation I/O interconnect bus, although the scope of the embodiments are not so limited.

As shown in FIG. 10, various I/O devices 65a (e.g., biometric scanners, speakers, cameras, sensors) may be coupled to the first bus 65, along with a bus bridge 66 which may couple the first bus 65 to a second bus 67. In one embodiment, the second bus 67 may be a low pin count (LPC) bus. Various devices may be coupled to the second bus 67 including, for example, a keyboard/mouse 67a, communication device(s) 67b, and a data storage unit 68 such as a disk drive or other mass storage device which may include code 69, in one embodiment. The illustrated code 69 may implement one or more aspects of the processes described above, including process 600 as described herein with reference to FIGS. 6A-6B. The illustrated code 69 may be similar to code 42 (FIG. 9), already discussed. Further, an audio I/O 67c may be coupled to the second bus 67 and a battery 61 may supply power to the computing system 60. The system 60 may implement one or more aspects of the wireless network control system 100, the short-term subsystem 120, the long-term subsystem 130, and/or the output response module 140 as described herein with reference to FIGS. 1A-1B, 2, 3, 4A-4B and 5.

Note that other embodiments are contemplated. For example, instead of the point-to-point architecture of FIG. 10, a system may implement a multi-drop bus or another such communication topology. Also, the elements of FIG. 10 may alternatively be partitioned using more or fewer integrated chips than shown in FIG. 10.

Embodiments of each of the above systems, devices, components and/or methods, including the system 10, the semiconductor apparatus 30, the processor core 40, the system 60, the wireless network control system 100, the short-term subsystem 120, the long-term subsystem 130, the output response module 140, process 600, and/or any other system components, may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof.

Alternatively, or additionally, all or portions of the foregoing systems and/or components and/or methods may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages.

ADDITIONAL NOTES AND EXAMPLES

Example 1 includes a network control system, comprising a sensor interface to obtain data from a plurality of sensors, a first subsystem comprising a plurality of distributed short-term memory modules, each short-term memory module associated with a wireless communication device, the first subsystem to adjust a communications parameter for one or more of the wireless communication devices based on data from one or more of the plurality of sensors, and a second subsystem coupled to the sensor interface and to the first subsystem comprising a processor, the processor including one or more substrates and logic coupled to the one or more substrates, wherein the logic is implemented at least partly in one or more of configurable logic or fixed-functionality hardware logic, the logic coupled to the one or more substrates to determine, via a neural network, a prediction of future performance of a wireless network based on a state of a network environment, wherein the state of the network environment includes information from the first subsystem and location information about the wireless communication devices and other objects in the network environment, and determine a change in network configuration to improve a quality of communications in the wireless network based on the prediction of future performance of the wireless network.

Example 2 includes the network control system of Example 1, wherein to determine a change in network configuration to improve a quality of communications in the wireless network the logic coupled to the one or more substrates is to adjust one or more network parameters, and wherein the one or more network parameters includes one or more of an increase in transmission power by one of the wireless communication devices or a change in an access point to be connected to the one of the wireless communication devices.

Example 3 includes the network control system of Example 1, wherein the first subsystem comprises a short-term subsystem and the second subsystem comprises a long-term subsystem, and wherein the information from the first subsystem is to include one or more received signal strength indication (RSSI) maps, each RSSI map associated with a channel state between an access point and one of the wireless communication devices, and wherein the prediction of future performance of the wireless network comprises a prediction of future RSSI values based on determined relationships between the RSSI maps and object locations relative to the access point and the wireless communication devices.

Example 4 includes the network control system of Example 3, wherein the system is to track a plurality of the wireless communication devices and a plurality of the other objects, and wherein the prediction of future performance of the wireless network includes a prediction of future attenuation in RSSI associated with a tracked moving object relative to the access point and a tracked one of the wireless communication devices.

Example 5 includes the network control system of Example 3, wherein the logic coupled to the one or more substrates is further to receive a plurality of time-stamped RSSI maps, wherein each of the plurality of time-stamped RSSI maps is associated with an object location, a time of day, a day of year, and one or more of temperature or humidity levels within the network environment, generate a plurality of generic path loss models based on the plurality of time-stamped RSSI maps, and record a sequence of events that cause a significant drop in RSSI, wherein to determine a change in network configuration is based on the plurality of generic path loss models and the sequence of events.

Example 6 includes the network control system of any of Examples 1-5, wherein the logic coupled to the one or more substrates is further to receive additional channel state information, and determine one or more of a positioning of one or more of the objects in the network environment or a prediction of future quality of service (QoS) for the wireless network.

Example 7 includes a semiconductor apparatus comprising one or more substrates, and logic coupled to the one or more substrates, wherein the logic is implemented at least partly in one or more of configurable logic or fixed-functionality hardware logic, the logic coupled to the one or more substrates to adjust, via a first subsystem, a communications parameter for one or more wireless communication devices based on data from one or more of a plurality of sensors, determine, via a neural network, a prediction of future performance of a wireless network based on a state of a network environment, wherein the state of the network environment includes information from the first subsystem and location information about the one or more wireless communication devices and other objects in the network environment, and determine a change in network configuration to improve a quality of communications in the wireless network based on the prediction of future performance of the wireless network.

Example 8 includes the semiconductor apparatus of Example 7, wherein to determine a change in network configuration to improve a quality of communications in the wireless network the logic coupled to the one or more substrates is to adjust one or more network parameters, and wherein the one or more network parameters includes one or more of an increase in transmission power by one of the wireless communication devices or a change in an access point to be connected to the one of the wireless communication devices.

Example 9 includes the semiconductor apparatus of Example 7, wherein the first subsystem comprises a short-term subsystem, and wherein the information from the first subsystem is to include one or more received signal strength indication (RSSI) maps, each RSSI map associated with a channel state between an access point and one of the wireless communication devices, and wherein the prediction of future performance of the wireless network comprises a prediction of future RSSI values based on determined relationships between the RSSI maps and object locations relative to the access point and the wireless communication devices.

Example 10 includes the semiconductor apparatus of Example 9, wherein the logic coupled to the one or more substrates is to track a plurality of the wireless communication devices and a plurality of the other objects, and wherein the prediction of future performance of the wireless network includes a prediction of future attenuation in RSSI associated with a tracked moving object relative to the access point and a tracked one of the wireless communication devices.

Example 11 includes the semiconductor apparatus of Example 9, wherein the logic coupled to the one or more substrates is further to receive a plurality of time-stamped RSSI maps, wherein each of the plurality of time-stamped RSSI maps is associated with an object location, a time of day, a day of year, and one or more of temperature or humidity levels within the network environment, generate a plurality of generic path loss models based on the plurality of time-stamped RSSI maps, and record a sequence of events that cause a significant drop in RSSI, wherein to determine a change in network configuration is based on the plurality of generic path loss models and the sequence of events.

Example 12 includes the semiconductor apparatus of any of Examples 7-11, wherein the logic coupled to the one or more substrates is further to receive additional channel state information, and determine one or more of a positioning of one or more of the objects in the network environment or a prediction of future quality of service (QoS) for the wireless network.

Example 13 includes the semiconductor apparatus of Examples 7, wherein the logic coupled to the one or more substrates includes transistor channel regions that are positioned within the one or more substrates.

Example 14 includes at least one non-transitory computer readable storage medium comprising a set of instructions which, when executed by a computing system, cause the computing system to adjust, via a first subsystem, a communications parameter for one or more wireless communication devices based on data from one or more of a plurality of sensors, determine, via a neural network, a prediction of future performance of a wireless network based on a state of a network environment, wherein the state of the network environment includes information from the first subsystem and location information about the one or more wireless communication devices and other objects in the network environment, and determine a change in network configuration to improve a quality of communications in the wireless network based on the prediction of future performance of the wireless network.

Example 15 includes the at least one non-transitory computer readable storage medium of Example 14, wherein to determine a change in network configuration to improve a quality of communications in the wireless network, the instructions, when executed, cause the computing system to adjust one or more network parameters, and wherein the one or more network parameters includes one or more of an increase in transmission power by one of the wireless communication devices or a change in an access point to be connected to the one of the wireless communication devices.

Example 16 includes the at least one non-transitory computer readable storage medium of Example 14, wherein the first subsystem comprises a short-term subsystem, and wherein the information from the first subsystem is to include one or more received signal strength indication (RSSI) maps, each RSSI map associated with a channel state between an access point and one of the wireless communication devices, and wherein the prediction of future performance of the wireless network comprises a prediction of future RSSI values based on determined relationships between the RSSI maps and object locations relative to the access point and the wireless communication devices.

Example 17 includes the at least one non-transitory computer readable storage medium of Example 16, wherein the instructions, when executed, further cause the computing system to track a plurality of the wireless communication devices and a plurality of the other objects, and wherein the prediction of future performance of the wireless network includes a prediction of future attenuation in RSSI associated with a tracked moving object relative to the access point and a tracked one of the wireless communication devices.

Example 18 includes the at least one non-transitory computer readable storage medium of Example 16, wherein the instructions, when executed, further cause the computing system to receive a plurality of time-stamped RSSI maps, wherein each of the plurality of time-stamped RSSI maps is associated with an object location, a time of day, a day of year, and one or more of temperature or humidity levels within the network environment, generate a plurality of generic path loss models based on the plurality of time-stamped RSSI maps, and record a sequence of events that cause a significant drop in RSSI, wherein to determine a change in network configuration is based on the plurality of generic path loss models and the sequence of events.

Example 19 includes the at least one non-transitory computer readable storage medium of any of Examples 14-18, wherein the instructions, when executed, further cause the computing system to receive additional channel state information, and determine one or more of a positioning of one or more of the objects in the network environment or a prediction of future quality of service (QoS) for the wireless network.

Example 20 includes a method of automated network control, comprising adjusting, via a first subsystem, a communications parameter for one or more wireless communication devices based on data from one or more of a plurality of sensors, determining, via a neural network, a prediction of future performance of a wireless network based on a state of a network environment, wherein the state of the network environment includes information from the first subsystem and location information about the one or more wireless communication devices and other objects in the network environment, and determining a change in network configuration to improve a quality of communications in the wireless network based on the prediction of future performance of the wireless network.

Example 21 includes the method of Example 20, wherein determining a change in network configuration to improve a quality of communications in the wireless network comprises adjusting one or more network parameters, and wherein the one or more network parameters includes one or more of an increase in transmission power by one of the wireless communication devices or a change in an access point to be connected to the one of the wireless communication devices.

Example 22 includes the method of Example 20, wherein the first subsystem comprises a short-term subsystem, and wherein the information from the first subsystem is to include one or more received signal strength indication (RSSI) maps, each RSSI map associated with a channel state between an access point and one of the wireless communication devices, and wherein the prediction of future performance of the wireless network comprises a prediction of future RSSI values based on determined relationships between the RSSI maps and object locations relative to the access point and the wireless communication devices.

Example 23 includes the method of Example 22, further comprising tracking a plurality of the wireless communication devices and a plurality of the other objects, wherein the prediction of future performance of the wireless network includes a prediction of future attenuation in RSSI associated with a tracked moving object relative to the access point and a tracked one of the wireless communication devices.

Example 24 includes the method of Example 22, further comprising receiving a plurality of time-stamped RSSI maps, wherein each of the plurality of time-stamped RSSI maps is associated with an object location, a time of day, a day of year, and one or more of temperature or humidity levels within the network environment, generating a plurality of generic path loss models based on the plurality of time-stamped RSSI maps, and recording a sequence of events that cause a significant drop in RSSI, wherein to determine a change in network configuration is based on the plurality of generic path loss models and the sequence of events.

Example 25 includes the method of any of Examples 20-24, further comprising receiving additional channel state information, and determining one or more of a positioning of one or more of the objects in the network environment or a prediction of future quality of service (QoS) for the wireless network.

Example 26 includes an apparatus comprising means for performing the method of any of Examples 20-24.

Thus, technology described herein enables highly-reliable wireless communications in wireless communication systems for a variety of applications, including industrial applications. The technology also provides for reliable wireless communications by actively managing network devices using a short-term/long-term paradigm that includes environment sensing to determine the actions to be taken. Using the short-term/long-term structure, management of a network for high reliable operation may be achieved by relying on memories and experiences observed in the past.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A network control system comprising:
 a sensor interface to obtain data from a plurality of sensors;
 a first subsystem comprising a plurality of distributed short-term memory modules, each short-term memory module associated with a wireless communication device, the first subsystem to adjust a communications parameter for one or more of the wireless communication devices based on data from one or more of the plurality of sensors; and
 a second subsystem coupled to the sensor interface and to the first subsystem comprising a processor, the processor including one or more substrates and logic coupled to the one or more substrates, wherein the logic is implemented at least partly in one or more of configurable logic or fixed-functionality hardware logic, the logic coupled to the one or more substrates to:
  determine, via a neural network, a prediction of future performance of a wireless network based on a state of a network environment, wherein the state of the network environment includes information from the first subsystem and location information about the wireless communication devices and other objects in the network environment, wherein the information from the first subsystem is to include one or more received signal strength indication (RSSI) maps, each RSSI map associated with a channel state between an access point and one of the wireless communication devices;
  determine a change in network configuration to improve a quality of communications in the wireless network based on the prediction of future performance of the wireless network;
  receive a plurality of time-stamped RSSI maps, wherein each of the plurality of time-stamped RSSI maps is associated with an object location, a time of day, a day of year, and one or more of temperature or humidity levels within the network environment;
  generate a plurality of generic path loss models based on the plurality of time-stamped RSSI maps; and
  record a sequence of events that cause a significant drop in RSSI;
  wherein to determine a change in network configuration is based on the plurality of generic path loss models and the sequence of events.

2. The network control system of claim 1, wherein to determine a change in network configuration to improve a quality of communications in the wireless network the logic coupled to the one or more substrates is to adjust one or more network parameters, and wherein the one or more network parameters includes one or more of an increase in transmission power by one of the wireless communication devices or a change in an access point to be connected to the one of the wireless communication devices.

3. The network control system of claim 1, wherein the first subsystem comprises a short-term subsystem and the second subsystem comprises a long-term subsystem, and
 wherein the prediction of future performance of the wireless network comprises a prediction of future RSSI values based on determined relationships between the RSSI maps and object locations relative to the access point and the wireless communication devices.

4. The network control system of claim 3, wherein the system is to track a plurality of the wireless communication devices and a plurality of the other objects, and
 wherein the prediction of future performance of the wireless network includes a prediction of future attenuation in RSSI values associated with a tracked moving object relative to the access point and a tracked one of the wireless communication devices.

5. The network control system of claim 3, wherein the logic coupled to the one or more substrates is further to:
 receive additional channel state information; and
 determine one or more of a positioning of one or more of the objects in the network environment or a prediction of future quality of service (QoS) for the wireless network.

6. A semiconductor apparatus comprising:
 one or more substrates; and
 logic coupled to the one or more substrates, wherein the logic is implemented at least partly in one or more of configurable logic or fixed-functionality hardware logic, the logic coupled to the one or more substrates to:
  adjust, via a first subsystem, a communications parameter for one or more wireless communication devices based on data from one or more of a plurality of sensors;
  determine, via a neural network, a prediction of future performance of a wireless network based on a state of a network environment, wherein the state of the network environment includes information from the first subsystem and location information about the one or more wireless communication devices and other objects in the network environment, wherein the information from the first subsystem is to include one or more received signal strength indication (RSSI) maps, each RSSI map associated with a channel state between an access point and one of the wireless communication devices;
  determine a change in network configuration to improve a quality of communications in the wireless network based on the prediction of future performance of the wireless network;
  receive a plurality of time-stamped RSSI maps, wherein each of the plurality of time-stamped RSSI maps is associated with an object location, a time of day, a day of year, and one or more of temperature or humidity levels within the network environment;
  generate a plurality of generic path loss models based on the plurality of time-stamped RSSI maps; and
  record a sequence of events that cause a significant drop in RSSI;

wherein to determine a change in network configuration is based on the plurality of generic path loss models and the sequence of events.

7. The semiconductor apparatus of claim 6, wherein to determine a change in network configuration to improve a quality of communications in the wireless network the logic coupled to the one or more substrates is to adjust one or more network parameters, and wherein the one or more network parameters includes one or more of an increase in transmission power by one of the wireless communication devices or a change in an access point to be connected to the one of the wireless communication devices.

8. The semiconductor apparatus of claim 6, wherein the first subsystem comprises a short-term subsystem, and
wherein the prediction of future performance of the wireless network comprises a prediction of future RSSI values based on determined relationships between the RSSI maps and object locations relative to the access point and the wireless communication devices.

9. The semiconductor apparatus of claim 8, wherein the logic coupled to the one or more substrates is to track a plurality of the wireless communication devices and a plurality of the other objects, and
wherein the prediction of future performance of the wireless network includes a prediction of future attenuation in RSSI values associated with a tracked moving object relative to the access point and a tracked one of the wireless communication devices.

10. The semiconductor apparatus of claim 8, wherein the logic coupled to the one or more substrates is further to:
receive additional channel state information; and
determine one or more of a positioning of one or more of the objects in the network environment or a prediction of future quality of service (QoS) for the wireless network.

11. The semiconductor apparatus of claim 6, wherein the logic coupled to the one or more substrates includes transistor channel regions that are positioned within the one or more substrates.

12. At least one non-transitory computer readable storage medium comprising a set of instructions which, when executed by a computing system, cause the computing system to:
adjust, via a first subsystem, a communications parameter for one or more wireless communication devices based on data from one or more of a plurality of sensors;
determine, via a neural network, a prediction of future performance of a wireless network based on a state of a network environment, wherein the state of the network environment includes information from the first subsystem and location information about the one or more wireless communication devices and other objects in the network environment, wherein the information from the first subsystem is to include one or more received signal strength indication (RSSI) maps, each RSSI map associated with a channel state between an access point and one of the wireless communication devices;
determine a change in network configuration to improve a quality of communications in the wireless network based on the prediction of future performance of the wireless network;
receive a plurality of time-stamped RSSI maps, wherein each of the plurality of time-stamped RSSI maps is associated with an object location, a time of day, a day of year, and one or more of temperature or humidity levels within the network environment;
generate a plurality of generic path loss models based on the plurality of time-stamped RSSI maps; and
record a sequence of events that cause a significant drop in RSSI;
wherein to determine a change in network configuration is based on the plurality of generic path loss models and the sequence of events.

13. The at least one non-transitory computer readable storage medium of claim 12, wherein to determine a change in network configuration to improve a quality of communications in the wireless network, the instructions, when executed, cause the computing system to adjust one or more network parameters, and wherein the one or more network parameters includes one or more of an increase in transmission power by one of the wireless communication devices or a change in an access point to be connected to the one of the wireless communication devices.

14. The at least one non-transitory computer readable storage medium of claim 12, wherein the first subsystem comprises a short-term subsystem, and
wherein the prediction of future performance of the wireless network comprises a prediction of future RSSI values based on determined relationships between the RSSI maps and object locations relative to the access point and the wireless communication devices.

15. The at least one non-transitory computer readable storage medium of claim 14, wherein the instructions, when executed, further cause the computing system to track a plurality of the wireless communication devices and a plurality of the other objects, and
wherein the prediction of future performance of the wireless network includes a prediction of future attenuation in RSSI values associated with a tracked moving object relative to the access point and a tracked one of the wireless communication devices.

16. The at least one non-transitory computer readable storage medium of claim 14, wherein the instructions, when executed, further cause the computing system to:
receive additional channel state information; and
determine one or more of a positioning of one or more of the objects in the network environment or a prediction of future quality of service (QoS) for the wireless network.

17. A method of automated network control, comprising:
adjusting, via a first subsystem, a communications parameter for one or more wireless communication devices based on data from one or more of a plurality of sensors;
determining, via a neural network, a prediction of future performance of a wireless network based on a state of a network environment, wherein the state of the network environment includes information from the first subsystem and location information about the one or more wireless communication devices and other objects in the network environment wherein the information from the first subsystem includes one or more received signal strength indication (RSSI) maps, each RSSI map associated with a channel state between an access point and one of the wireless communication devices;
determining a change in network configuration to improve a quality of communications in the wireless network based on the prediction of future performance of the wireless network;
receiving a plurality of time-stamped RSSI maps, wherein each of the plurality of time-stamped RSSI maps is associated with an object location, a time of day, a day of year, and one or more of temperature or humidity levels within the network environment;

generating a plurality of generic path loss models based on the plurality of time-stamped RSSI maps; and recording a sequence of events that cause a significant drop in RSSI;

wherein determining a change in network configuration is based on the plurality of generic path loss models and the sequence of events.

18. The method of claim 17, wherein determining a change in network configuration to improve a quality of communications in the wireless network comprises adjusting one or more network parameters, and wherein the one or more network parameters includes one or more of an increase in transmission power by one of the wireless communication devices or a change in an access point to be connected to the one of the wireless communication devices.

19. The method of claim 17, wherein the first subsystem comprises a short-term subsystem, and wherein the prediction of future performance of the wireless network comprises a prediction of future RSSI values based on determined relationships between the RSSI maps and object locations relative to the access point and the wireless communication devices.

20. The method of claim 19, further comprising tracking a plurality of the wireless communication devices and a plurality of the other objects, wherein the prediction of future performance of the wireless network includes a prediction of future attenuation in RSSI values associated with a tracked moving object relative to the access point and a tracked one of the wireless communication devices.

21. The method of claim 19, further comprising:
receiving additional channel state information; and
determining one or more of a positioning of one or more of the objects in the network environment or a prediction of future quality of service (QoS) for the wireless network.

22. The network control system of claim 1, wherein the neural network is trained based on detecting and tracking positions of objects in a training environment and on expected RSSI values of network devices in the training environment, wherein at least one of the objects is a moving object that becomes an occluding object.

23. The semiconductor apparatus of claim 6, wherein the neural network is trained based on detecting and tracking positions of objects in a training environment and on expected RSSI values of network devices in the training environment, wherein at least one of the objects is a moving object that becomes an occluding object.

24. The at least one non-transitory computer readable storage medium of claim 12, wherein the neural network is trained based on detecting and tracking positions of objects in a training environment and on expected RSSI values of network devices in the training environment, wherein at least one of the objects is a moving object that becomes an occluding object.

25. The method of claim 17, wherein the neural network is trained based on detecting and tracking positions of objects in a training environment and on expected RSSI values of network devices in the training environment, wherein at least one of the objects is a moving object that becomes an occluding object.

* * * * *